May 24, 1966 F. L. HILL ETAL 3,252,520
TOMATO HARVESTER
Filed Oct. 31, 1961 17 Sheets-Sheet 1

INVENTORS
FREDRICK L. HILL
LAUREN W. GATES
BY
Owen, Wickersham & Erickson
ATTY.

May 24, 1966

F. L. HILL ETAL 3,252,520

TOMATO HARVESTER

Filed Oct. 31, 1961

INVENTORS.
FREDRICK L. HILL
LAUREN W. GATES

BY

Owen, Wickersham & Erickson

ATTY.

May 24, 1966  F. L. HILL ETAL  3,252,520
TOMATO HARVESTER
Filed Oct. 31, 1961  17 Sheets-Sheet 5

Fig. 5

INVENTORS
FREDRICK L. HILL
LAUREN W. GATES
BY
Owen, Wickersham & Erickson
ATTY.

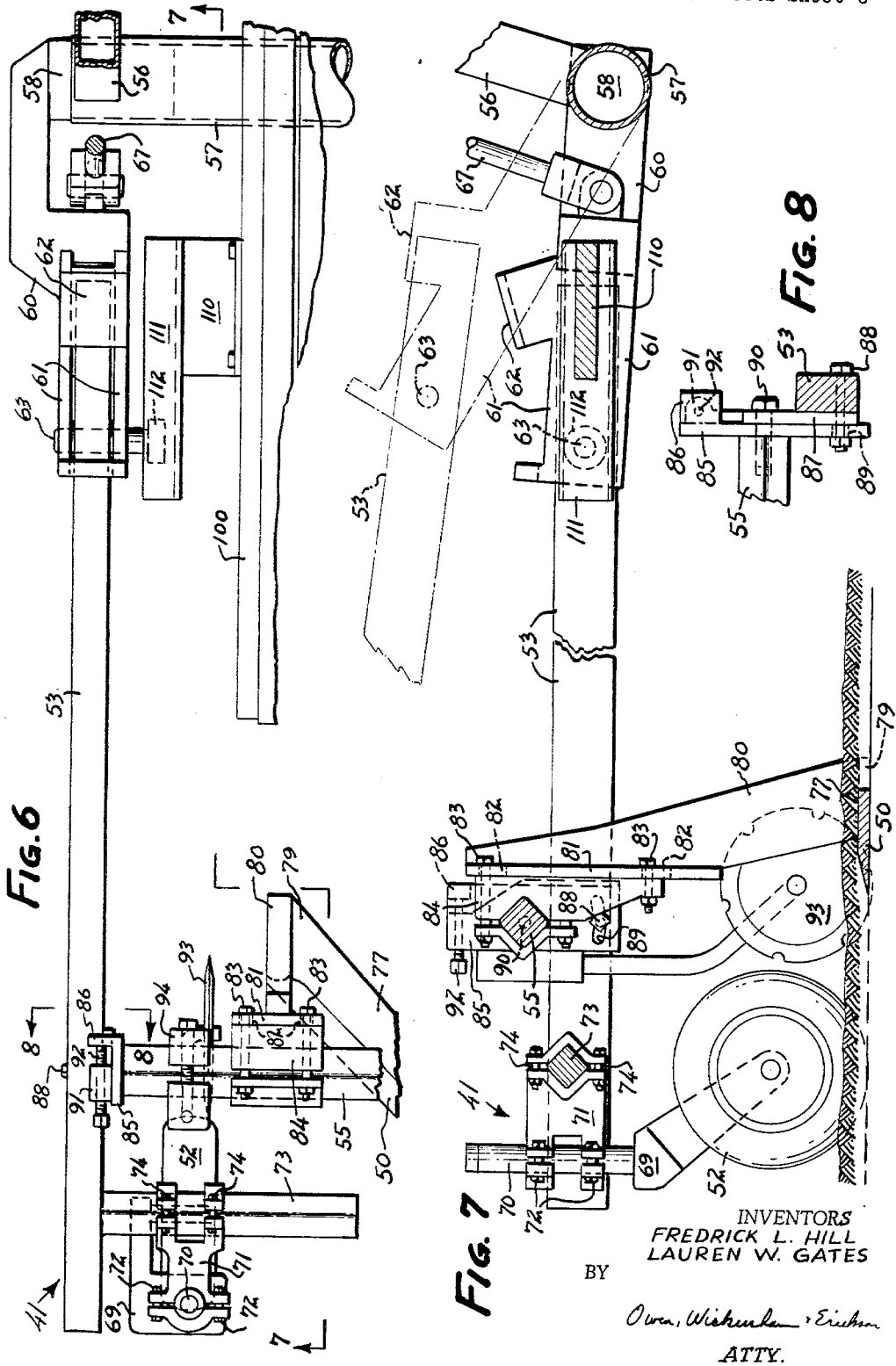

May 24, 1966

F. L. HILL ETAL 3,252,520

TOMATO HARVESTER

Filed Oct. 31, 1961

INVENTORS
FREDRICK L. HILL
LAUREN W. GATES

BY

Owen, Wickersham & Erickson

ATTY.

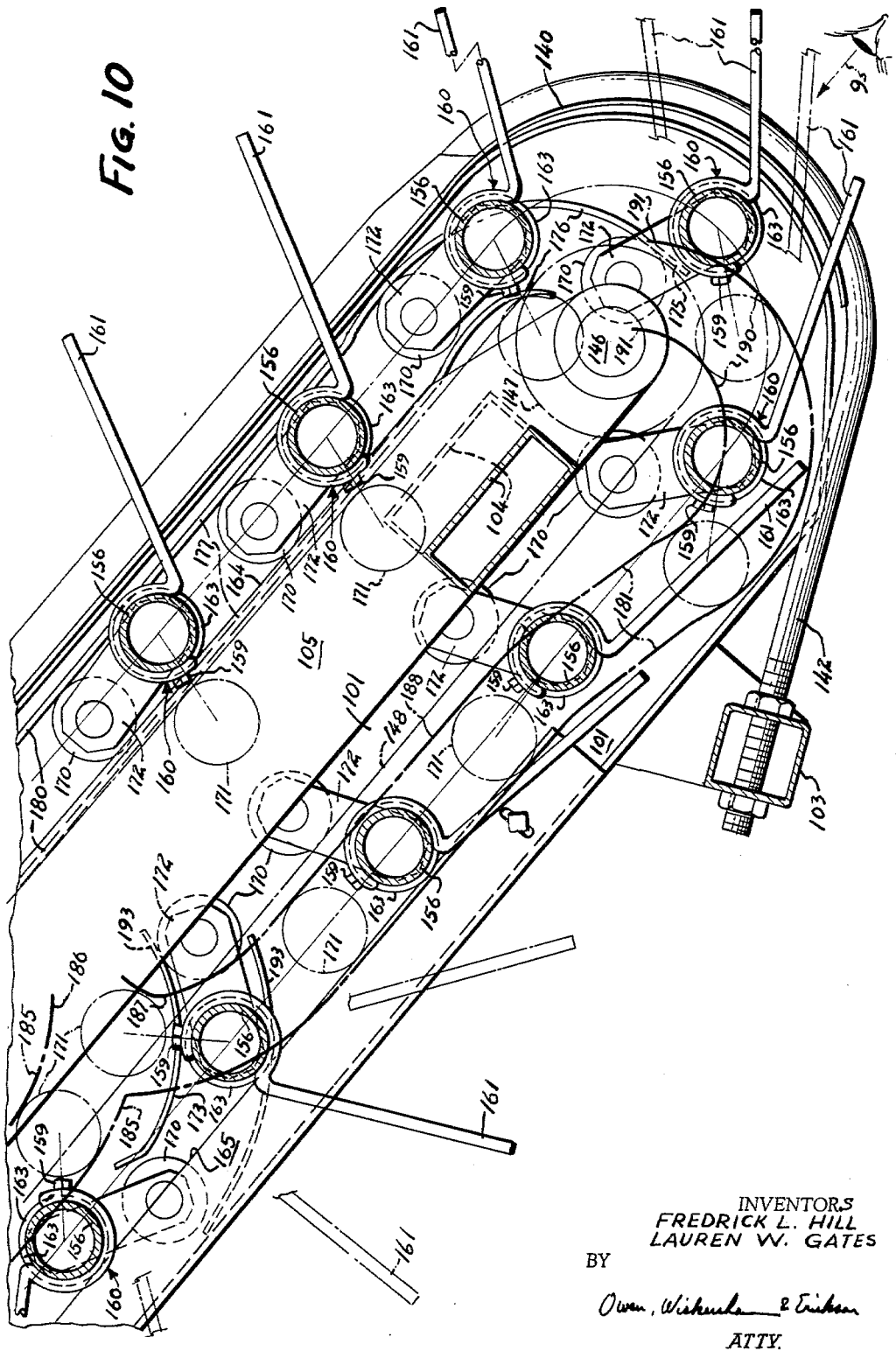

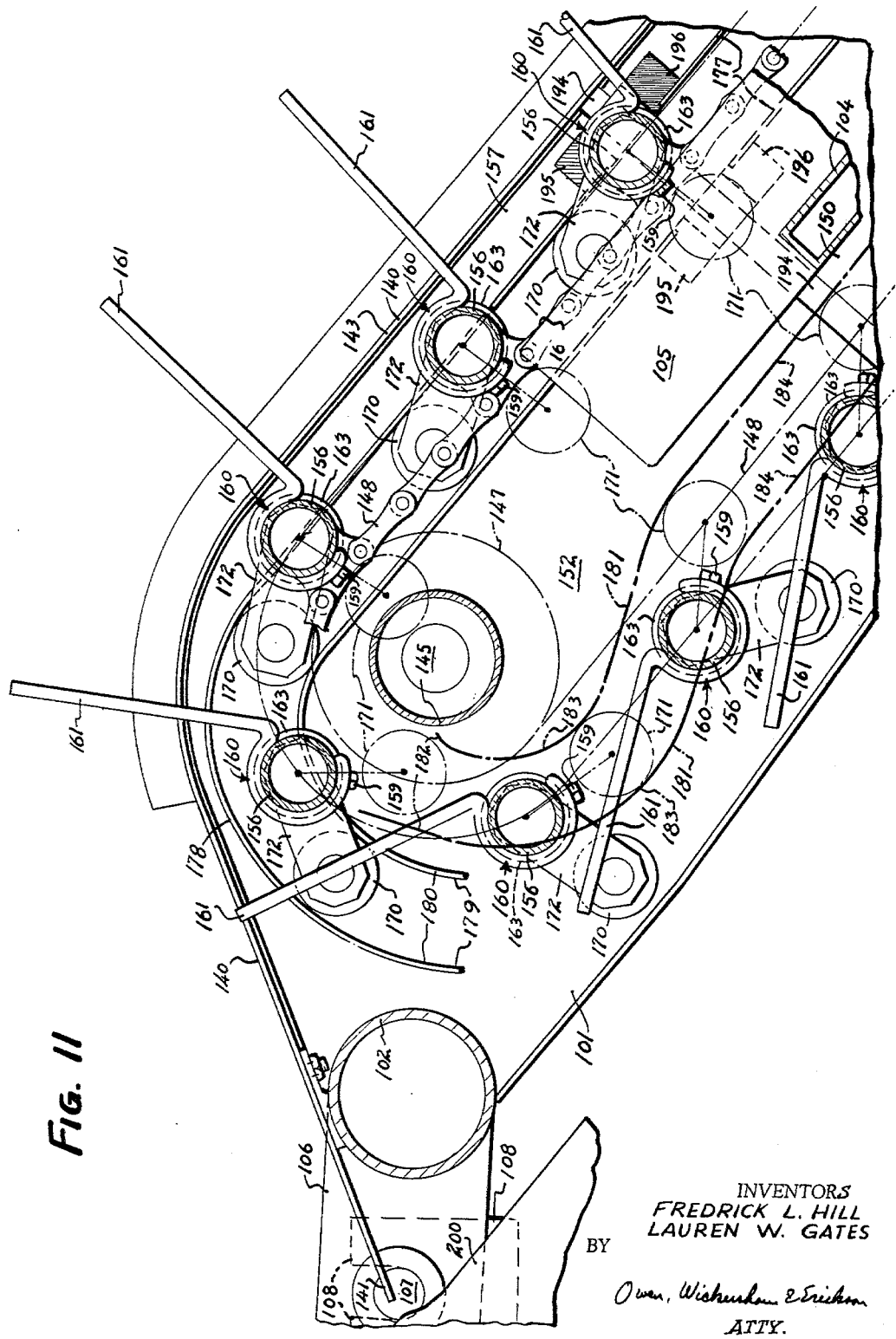

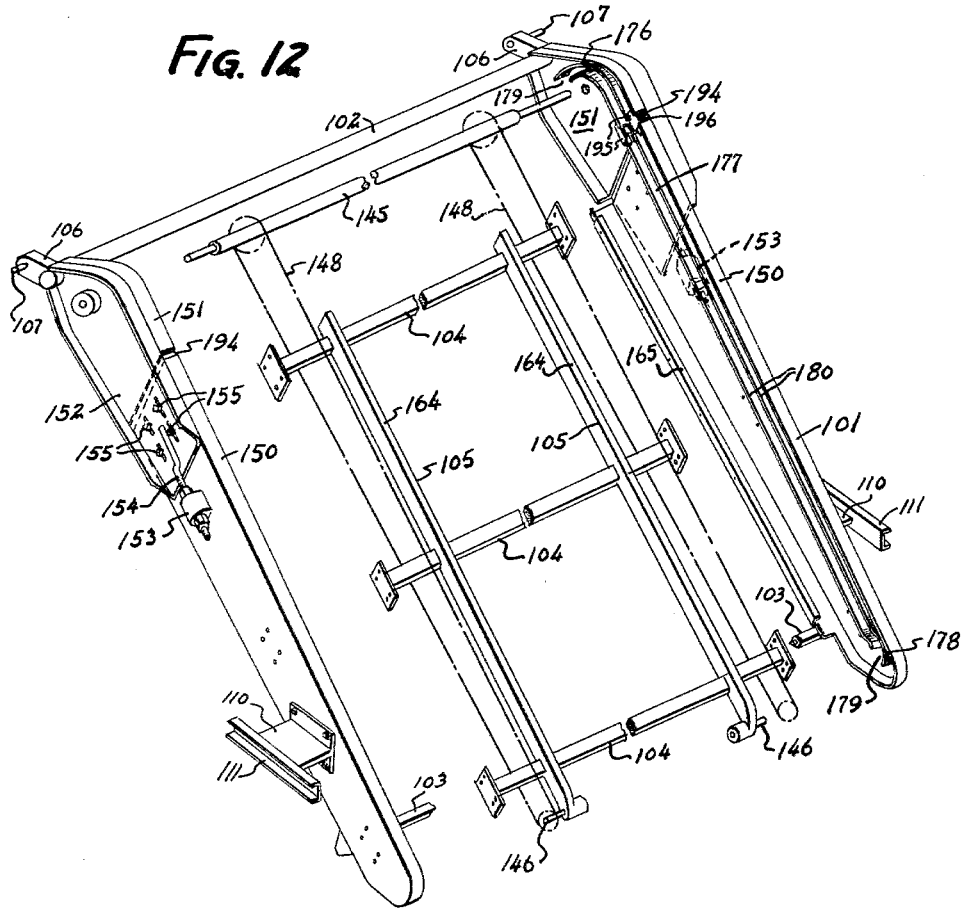
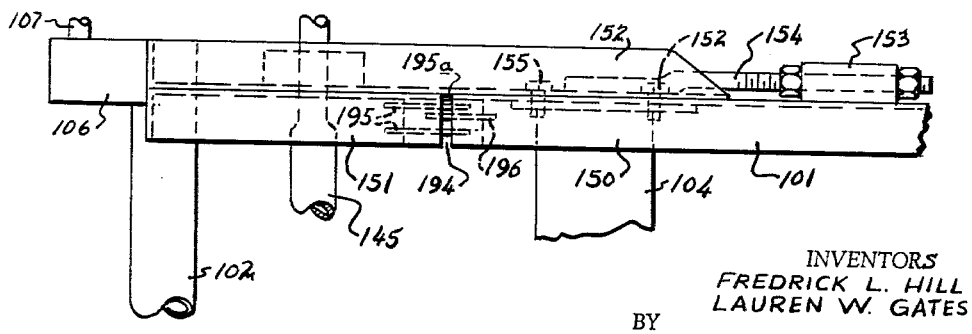

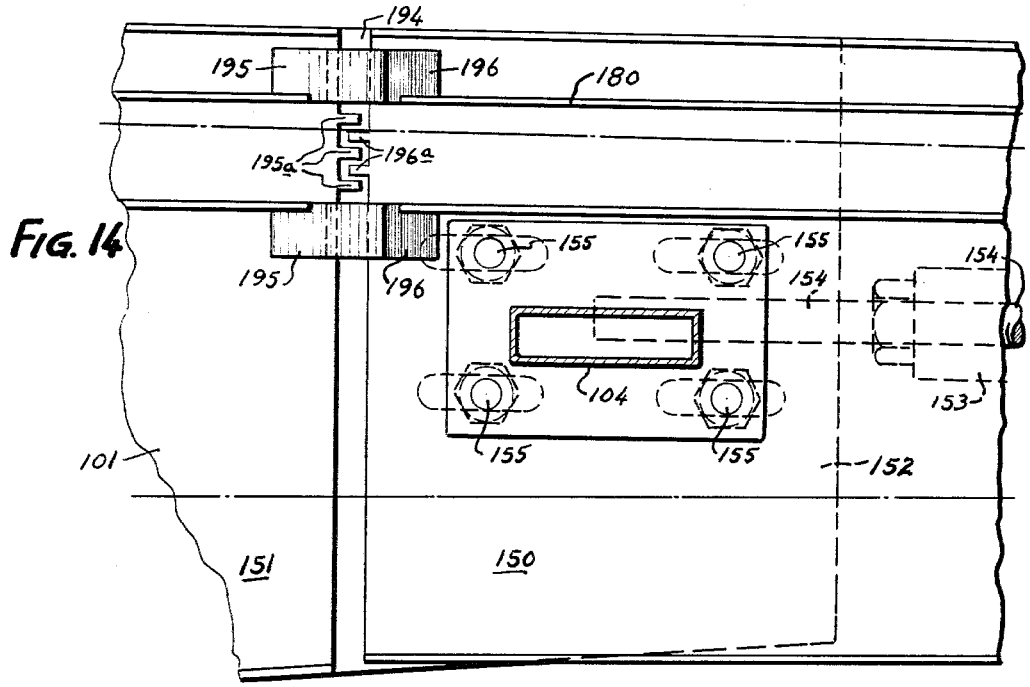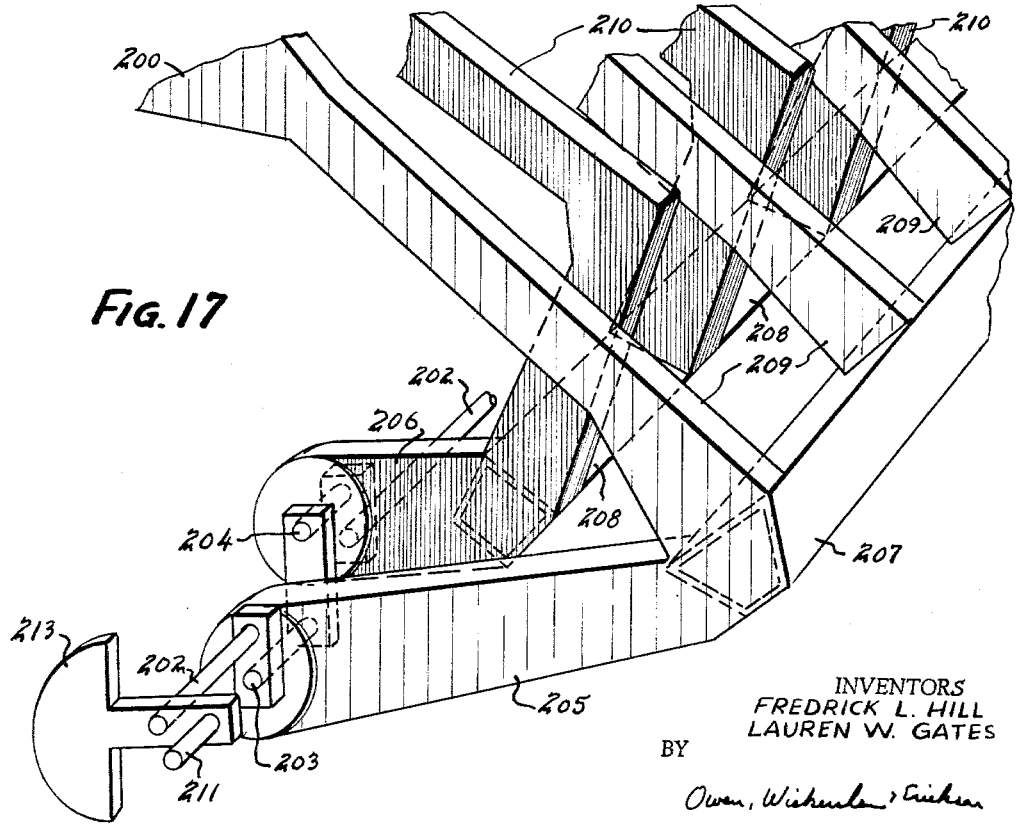

May 24, 1966   F. L. HILL ETAL   3,252,520
TOMATO HARVESTER
Filed Oct. 31, 1961   17 Sheets-Sheet 12
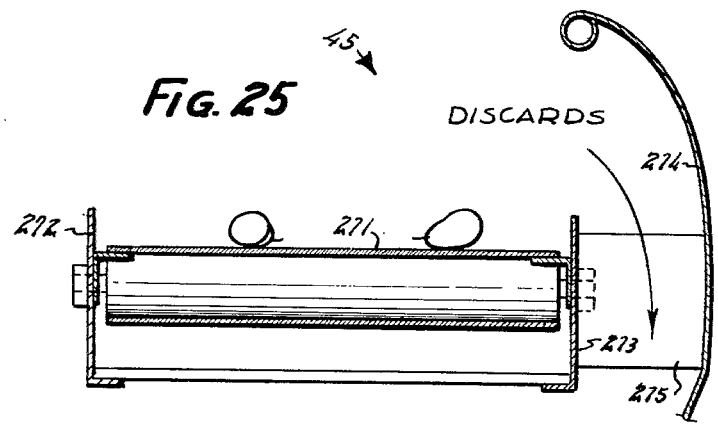
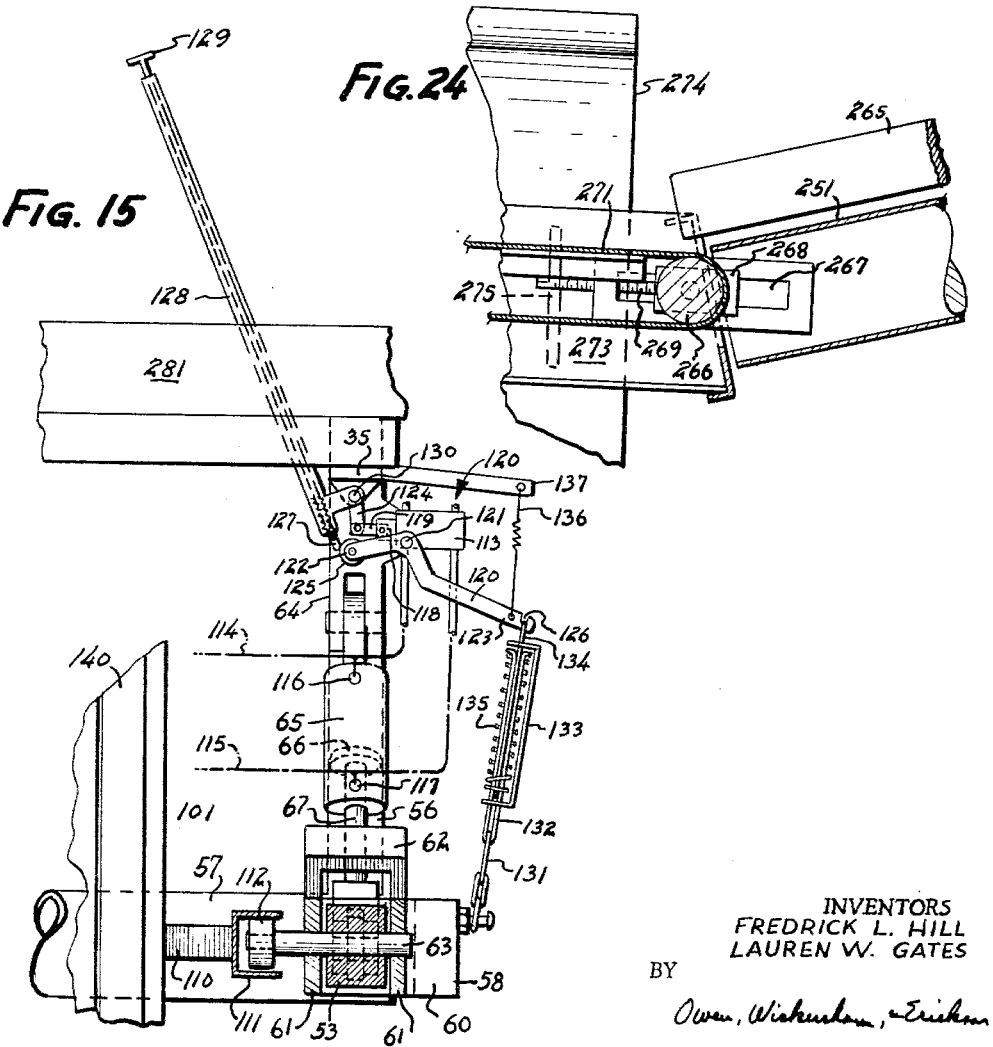
INVENTORS
FREDRICK L. HILL
LAUREN W. GATES
BY
Owen, Wickersham, Erickson
ATTY.

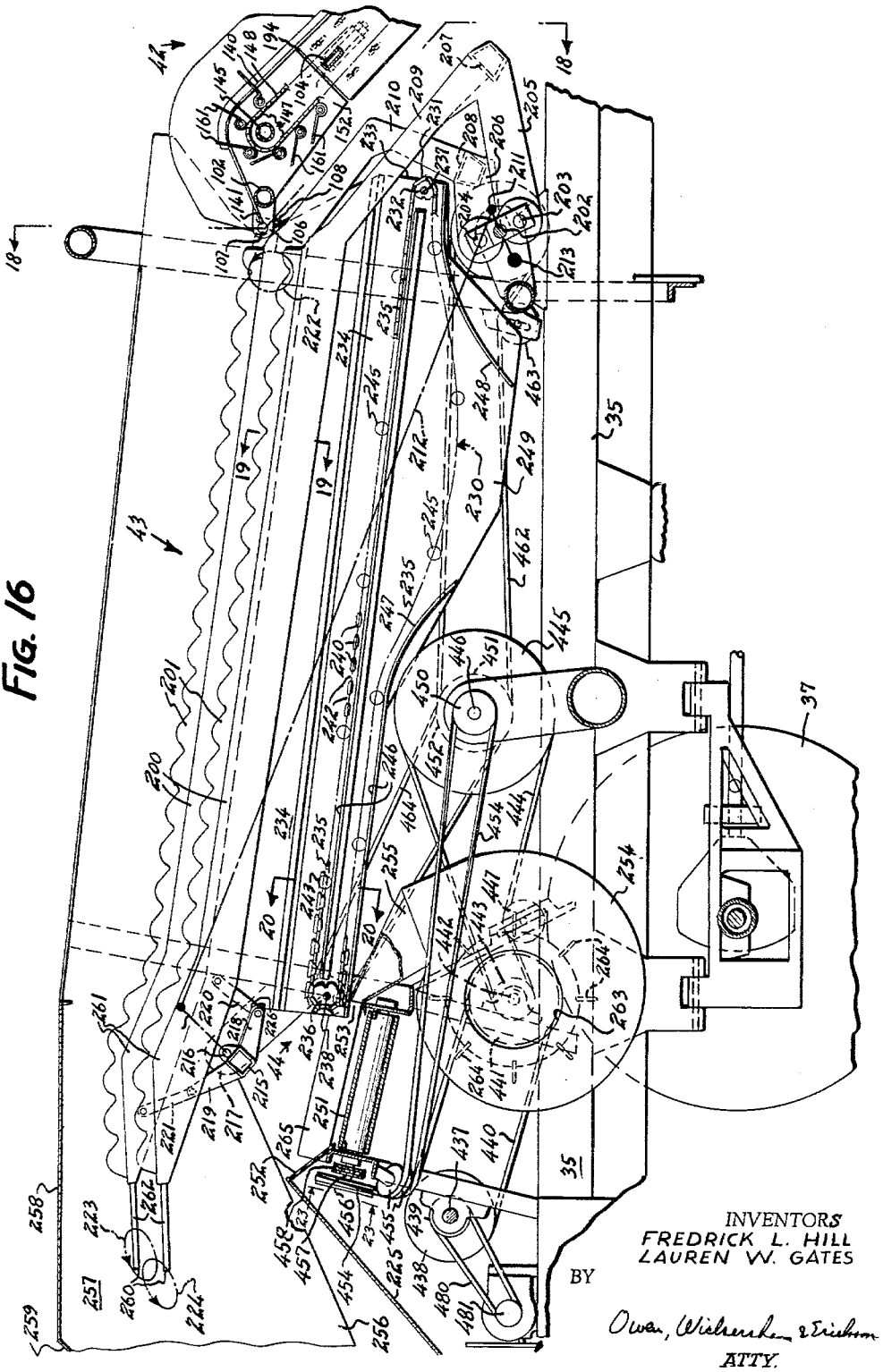

May 24, 1966　　F. L. HILL ETAL　　3,252,520
TOMATO HARVESTER
Filed Oct. 31, 1961　　17 Sheets-Sheet 14
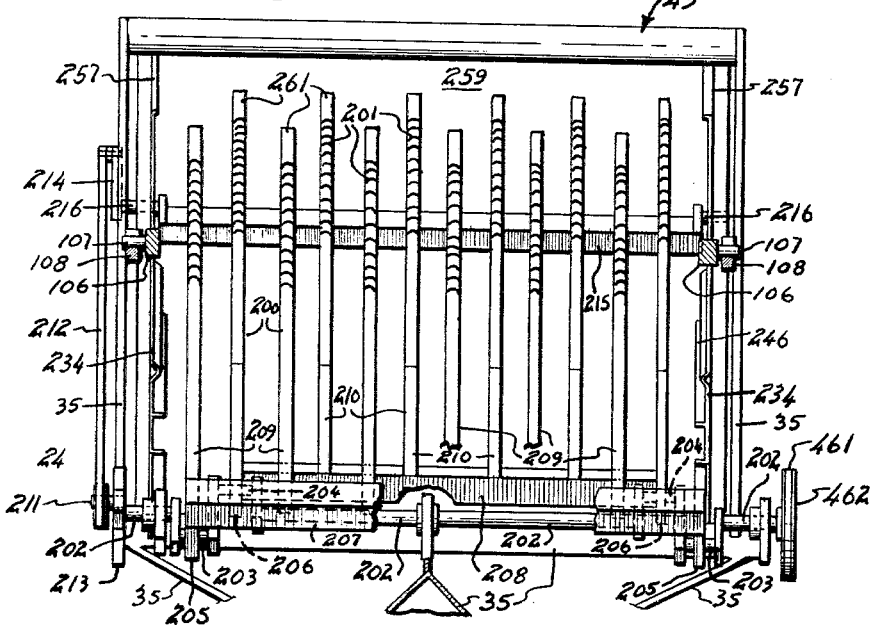
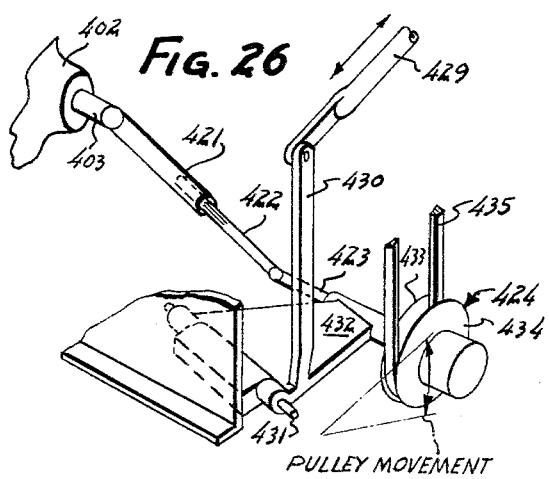
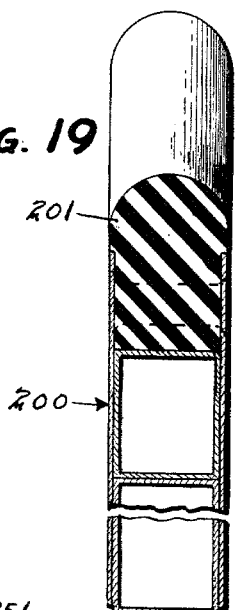
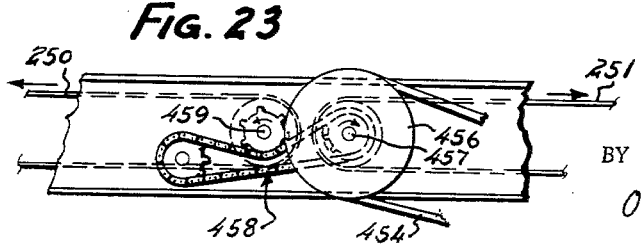
INVENTORS
FREDRICK L. HILL
LAUREN W. GATES
BY
Owen, Wickersham & Erickson
ATTY.

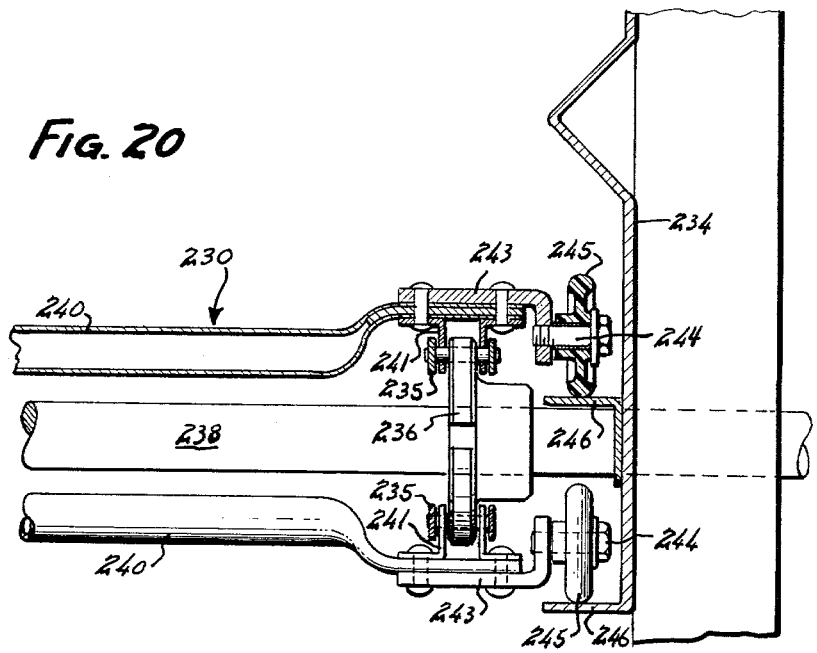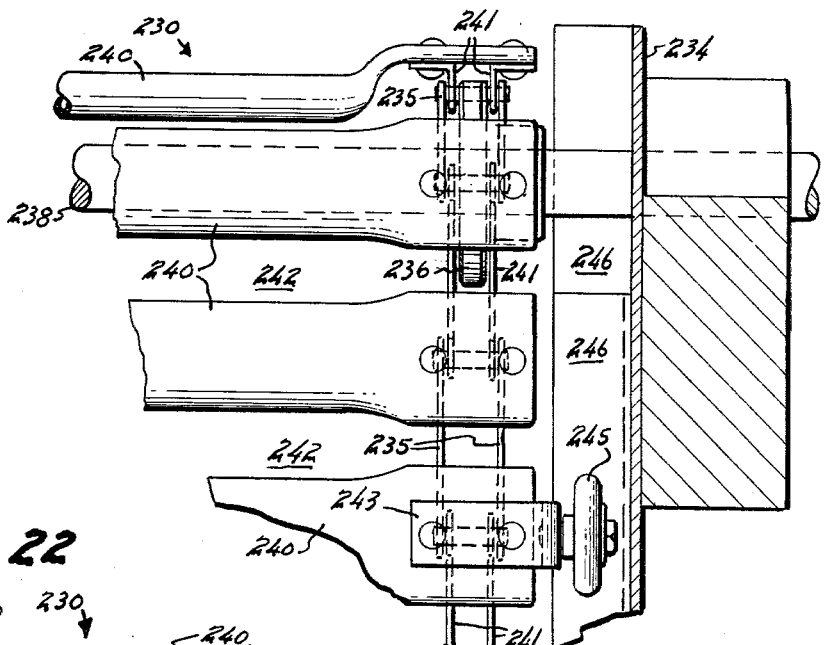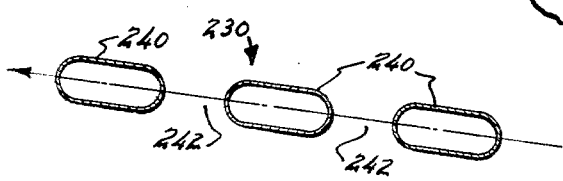

May 24, 1966 F. L. HILL ETAL 3,252,520
TOMATO HARVESTER
Filed Oct. 31, 1961 17 Sheets-Sheet 16

INVENTORS
FREDRICK L. HILL
LAUREN W. GATES
BY
Owen, Wickersham & Erickson
ATTY.

United States Patent Office 3,252,520
Patented May 24, 1966

3,252,520
TOMATO HARVESTER
Fredrick L. Hill, Rio Vista, and Lauren W. Gates, Lodi, Calif., assignors to The Regents of the University of California, Berkeley, Calif.
Filed Oct. 31, 1961, Ser. No. 148,963
10 Claims. (Cl. 171—94)

This invention relates to improvements in tomato harvesters. More particularly it relates to improvements in harvesters like that shown in U.S. patent application Serial No. 59,031, filed September 28, 1960, by Lorenzen, Szluka, and Hill, now Patent No. 3,199,604.

The present invention follows the basic teaching of that patent application in that it mechanically takes the whole vine up from the field and shakes the tomatoes off, separates the tomatoes from the leaves, dirt, and other matter, and provides for the sorting of the tomatoes and their loading into bins. Also like the invention disclosed in that application, in the present machine (a) a cutting device cuts the vine's main stem, preferably at root level; (b) a pickup device gently elevates the vine to a shaking device; (c) at the shaking device, rubber-covered walking bars mounted in two contrary-moving sets agitate the vine and advance it along the bars, while providing a gradually increasing shaking force as the vine moves from one end of the shaker to the other; (d) the vine is carried to the end of the shaking device and falls to the ground through an open chute; (e) the tomatoes removed by the shaker fall directly onto a conveyor, which carries them rearwardly; (f) certain devices remove dirt, leaves, and trash from the harvested tomatoes; (g) the tomatoes are cross-conveyed to sorting belts; (h) the tomatoes are visually sorted by hand as the sorting belts move them; (i) the sorted tomatoes are conveyed into containers, preferably located on a trailer being pulled parallel to the harvester; and (j) the tomatoes are then hauled away by trucks.

An important problem solved by this invention is that of preventing the tomato vines from wrapping themselves around the cutter blade which cuts the vines, ultimately preventing its proper operation, to the extent that the harvester would have to be stopped and the entangled vines cut away and removed. The invention solves this problem by providing a novel V-shaped cutter blade, with one end completely free. This novel blade is self-cleaning. In addition, structure is provided for adjusting the position of the blade relative to the ground.

Another problem solved by this invention is concerned with the relationship between the cutter and the pickup unit. When they were connected as they were in the referred-to patent application, the cutter was raised whenever the pickup unit was raised. However, in practice this meant that when the pickup was raised momentarily to keep it high enough above ground to keep it clean, the cutter blade was sometimes pulled out of the ground. The problem has been solved in this invention by a combination employing a novel type of lost-motion connection. The cutter is gauged by its own caster wheel, while the tractor wheels gauge the pickup unit, and a hydraulic lifting device cooperates with the lost-motion connection so that the position of the pickup unit can be moved up and down a certain amount without affecting the position of the cutter. Once the limits of the lost-motion connection are exceeded, the cutter blade is raised when the pickup unit is raised.

Another problem was to retain the cam rollers of the pickup unit on their tracks, especially in bumpy ground. This problem has been solved by providing a series of nylon rollers to support the moving elements, leaving the cam rollers to perform substantially only a guiding function. In addition a significant change has been made in the shape and action of the cam to provide an improved pattern for the movement of the tines.

Some difficulty has been experienced in transfer of the vines from the pickup unit to the shaker unit. An attempt was made to have the shaker's walking bars move through gaps between guide strips of the pickup unit, but this resulted in problems of entanglement and interference with or stoppage of the movement of the vines onto the shaker. This problem has been solved by improvements in the transfer portion, described later.

As stated earlier, the shaker uses two series of oppositely phased walking bars. In the prior device these bars were mounted on two crankshafts, but there was trouble because the tomatoes falling onto the crankshafts were being damaged beyond use and built up troublesome deposits on the crankshaft. The present invention has solved this problem by a novel mounting for the bars in which the space between the bars is completely unencumbered, free of all obstructions. The result is that far fewer tomatoes are damaged.

There was also a problem with vines wrapping themselves onto parts of the shaker and plugging the device, and the invention solves this problem by a novel arrangement, location, and combination of parts, which prevents vine accumulation.

The form of the walking bars themselves has been changed, too. It was discovered that finger-like projections on the bars were too quickly worn away and that they tended to damage the tomatoes. Plain bars will not advance the vines properly. The invention solves the problem by providing the bars with undulating wide upper surfaces that advance the vines without damage to the tomatoes and with considerably less wear on the bar surfaces.

Leaves, dirt and debris were always problems in previous tomato harvesting. In this invention the conveyor that catches the tomatoes that fall through the shaker also has a structure that gets rid of most of the dirt and some debris, while a novel combination of blowers, the shaker, and certain conveyors, enables the device to clean out an astonishing amount of debris from the fruit, and improved novel transfer structures enable elimination of more of this material during transfer from the collecting conveyor to some cross conveyors.

Another feature of the invention is that the tomatoes carried to the rear of the shaker by the collecting conveyors and sent by cross-conveyor belts out to the sides, are transferred to forwardly moving conveyor belts that carry them past a sorting station located beside the shaker and the pickup, thereby substantially shortening the device and making it much more maneuverable than where the sorting station is located behind the shaker. Also a simplified conveyor system saves power and gives greater efficiency.

The invention also deals with the problem of loading tomatoes into boxes or bins after they have been harvested. Previously, this step had been carried out by hand or by simply dropping the tomatoes off a conveyor into the box or bin, with severe damage in many cases to many tomatoes. The present invention has solved this problem by providing a novel depositing device which slows down the falling velocity of the tomatoes and lets them drop only a short distance into the bin or box. It receives tomatoes as they drop off the end of a side boom conveyor and gently deposits them into the bin. Moreover, the invention solves the problem of preventing damage to the conveyor and depositing device that might occur due to the different relative speeds between the bin and the tomato harvesting machine, for the bin is usually moved by a separate prime mover. It does this by a structure causing the depositing device to swing relative to the conveyor, if and when the bin strikes it.

Another important feature of the invention is a novel drive system by which the relations between speeds can better be controlled. The tomato harvesting unit, like that of the prior patent application, is characterized by the fact that the pickup conveyor moves at the same speed but in the reverse direction to the ground speed of the vehicle, so that the vines are lifted vertically with no substantial forward or back motion. This relation is kept constant, but it is important to be able to vary their absolute values, for the rate of harvest is usually limited mainly by the ability of the sorting crew to keep up with their job of removing the fruit that is unsuitable for use. To utilize fully the crew's ability, the rate at which the fruit is presented to them must be under control at all times, so that changes in yield or in the percent of culls presented to them will neither underload nor overload the crew. Hence, the ground speed is varied; at the same time the speeds of the conveyors, blowers, and other machine parts move at a constant speed in order to be at their best efficiency. A novel system employing an engine governor is used to obtain this result in a different manner than has heretofore been attempted and with highly superior results.

By locating the delivery means within the driver's view and providing controls for various elements, the driver is given a controlling position over the entire operation and can do much to improve the efficiency of the harvesting operation so that total crew size can be reduced.

Further explanation of each step and stage, together with exposition of the problems encountered, will be given in, and other objects and advantages of the invention will appear from, the following detailed description of a preferred embodiment of the invention.

In the drawings:

FIG. 1 is a top plan view of a tomato harvesting machine embodying the principles of the invention. The output conveyor is broken and its end portion set to one side. Some portions are broken away to show parts that are normally hidden from view.

FIG. 5 is a diagrammatic plan view of the driving systems for the vehicle and conveyors.

FIG. 6 is a fragmentary plan view of the right-hand side of the cutter assembly and a portion of the connection thereof to the main frame and the pickup unit.

FIG. 7 is a view in vertical longitudinal section taken along the line 7—7 in FIG. 6. Broken lines indicate a raised position and illustrate the operation of the lost-motion connection between the cutter assembly and the lifting assembly.

FIG. 8 is a view in vertical widthwise section taken along the line 8—8 in FIG. 6.

FIG. 10 is a view in section taken generally along the line 10—10 in FIG. 9 (also in FIG. 3, from which it is enlarged) showing the lower portion of the cam system of the pickup unit, with the dot-dash broken lines indicating superposition there of the cam from the opposite side of the unit and its rollers, as well as some positions of the time fingers.

FIG. 11 is a view similar to FIG. 10 of the upper portion of the same cam system.

FIG. 12 is a perspective view, partially imploded, of the frame of the pickup unit, some portions being broken to enable the implosion. The chains are indicated by dot-dash lines.

FIG. 13 is a fragmentary top plan view of a portion of one of the pickup unit side frame members.

FIG. 14 is an enlarged fragmentary side elevational view of the frame portions shown in FIG. 13.

FIG. 15 is a view in section taken along the line 15—15 in FIG. 1, of an adjusting device for the vertical heights of the pickup and cutter units.

FIG. 16 is a fragmentary view in side elevation and partly in section of the shaker unit and adjacent portions of the machine.

FIG. 17 is a simplified fragmentary view in perspective of the forward portion of the shaker unit.

FIG. 18 is a view in vertical section taken along the line 18—18 in FIG. 16, showing the walking bars and their crankshaft, with some parts broken away to show other parts better.

FIG. 19 is a view in section of a walking bar taken along the line 19—19 in FIG. 16.

FIG. 20 is a fragmentary view in section taken along the line 20—20 in FIG. 16, showing the conveyor onto which the shaker unit shakes the tomatoes.

FIG. 21 is a plan view of the elements of FIG. 20.

FIG. 22 is a side elevation diagram of the conveyor of FIGS. 20 and 21, with a dot-dash line indicating the tilt of the conveyor.

FIG. 23 is a fragmentary view in rear elevation taken along the line 23—23 in FIG. 16 showing the drive for the cross conveyors at the rear of the shaker unit.

FIG. 24 is a fragmentary view in elevation and in section taken along the line 24—24 in FIG. 1, showing the transfer from a cross conveyor to a sorting conveyor.

FIG. 25 is a fragmentary view in elevation and in section of the sorting conveyor and discard chute, taken along the line 25—25 in FIG. 1.

FIG. 26 is a view in perspective of a portion of the drive system.

BRIEF GENERAL DESCRIPTION (FIGS. 1–4)

Figure 1:
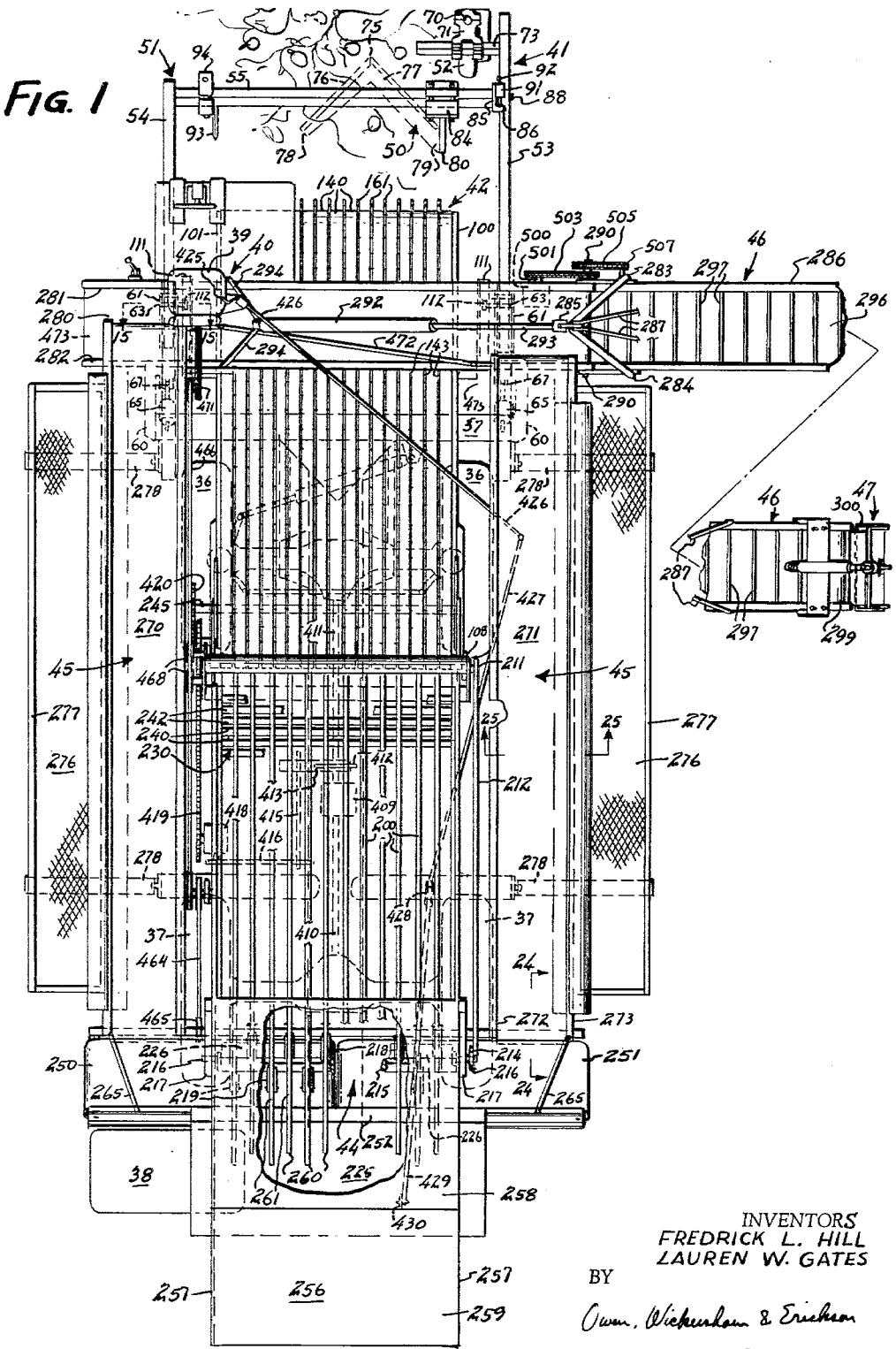

The drawings show a tomato harvester embodying the invention and having a main frame 35 supported on front wheels 36 and rear wheels 37. The frame 35 carries an engine or self-propelling means 38, a driver's seat 39, and driving and steering controls 40. The main frame 35 also supports a cutting means 41 at the front, a pickup and vine-lifting means 42 behind it, a shaking means 43 behind that, a de-leafing means 44 at the rear of the shaking means 43, sorting stations 45 alongside and outside the shaking means 43, an output conveyor 46 at the forward end of the sorting station 45, and a fruit-depositing device 47 at the outer end of the output conveyor 46. The device 47 places the harvested tomatoes into a bin 48 that is moved alongside the harvester. Each of these elements will be described in detail and their connection to each other explained.

THE CUTTING MEANS 41 (FIGS. 1–3, 6–8 AND 15)

An important feature of this invention is the provision at the forward end of the harvester of an assembly 41 for automatically cutting off each tomato plant in the path of the machine. The cut may be made at, below, or above the ground level, depending on the conditions encountered, but generally it will be below the ground, and the cut is made without shaking off or cutting into the tomatoes carried by the vine.

A cutter assembly 41 embodying the improvements in the present invention includes a novel V-shaped blade 50 supported generally horizontally, i.e., generally parallel to the ground level by an adjustable connection to a cutter frame 51 and gauged by a single wheel 52. The frame 51 includes two parallel longitudinally extending bars 53 and 54 joined by a lateral bar 55 and is pivotally mounted on the forward end of the main frame 35 through a lost-motion connection. For this purpose, the main frame 35 may have a pair of depending arms 56 (see FIGS. 2 and 6), forward of the front wheels 36, supporting a pipe-like cross-support and bearing member 57 in each end of which is journaled a stub shaft 58. Each stub shaft 58 is a rigid and integral portion of a support member 60, and the member 60 has an open-topped channel 61 forward of and in line with the arm 56 and bridged by an integral raised stop member 62. The frame members 53 and 54 of the cutter 41 fit into respective channels 61 and are rotatably linked to them by pivot axles 63.

To each of two brackets 64 forming part of the main frame 35 is pivotally secured a hydraulic cylinder 65. The piston 66 of each cylinder 65 has a piston rod 67 pivotally secured to support member 60. As in the earlier-referred-to patent application, the fluid for the cylinder 65 may be supplied by a hydraulic pump 68 that is driven by the engine 38 (see FIG. 30). Thus, when hydraulic fluid is supplied to the lower ends of the cylinders 65, the pistons 66 and piston rods 67 move upwardly and the cylinder 65 and swing the support members 60 up about their journals 57, raising the channels 61. At first the raising of the support members 60 does not affect the cutter frame 51, but when the channels 61 have been raised to the point where their stops 62 engage the cutter frame bars 53 and 54, further lifting of the support members 60 also lifts the cutter frame 51, including the knife blades 50.

At the forward end of the right-hand frame member 53 is the gauge wheel 52, supported in front of the V-shaped knife 50 by a caster yoke 69 having a vertical rigid shaft 70. The shaft 70 is adjustable vertically in a bracket 71 with the aid of bolts 72, and the bracket 71 is itself adjustable laterally along a rectangular stub bar 73 that extends out perpendicularly and rigidly from the frame bar 53, bolts 74 being used to tighten the bracket 71 to the bar 73. Thus the gauge wheel 52 is adjustable both vertically and laterally relative to the cutter frame 51. The wheel 52 and the channels 61 therefore provide a three-point support for the cutter frame 51.

The new knife 50 is an important innovation. It is V-shaped, as seen in plan, with a vertex 75 facing forwardly and trailing blades 76 and 77. The blade 76 is the one used to cut the stem of the vine, and its rear end 78 is free, that is, unconnected to anything. Thus the vine or vine parts can freely slide along the blade 76 and drop off the rear end 78. In fact, only the rear end 79 of the blade 77 is connected to anything and being a trailing end on the opposite side from the stem of the vine, leaves and vine portions can easily slide off it.

A post 80 extends up generally vertically, with a forward inclination, from the rear end 79 of the blade 77 and has a forwardly facing vertical face plate 81. Vertical slots 82 in the face plate 81 provide for vertical adjustment of bolts 83, which attach the plate 81 to a sliding split collar 84. The bolts 83 are also used to tighten the collar 84 in any desired lateral position along the rectangular lateral frame bar 55. The bar 55 may be and preferably is fixedly mounted to the longitudinal bar 54, but further adjustment is provided by its connection to the bar 53 through an end-member 85 mounted rigidly on the bar 55 and having a lateral extension 86. A bearing plate 87 is secured to the bar 53 by a bolt 88 which also extends through an arcuate slot 89 in the end member 85. A pivot 90 extends through the plate 87 and into the bar 55, while a retainer 91 at the upper end of the plate 87 supports a longitudinally extending adjustment screw 92, which bears against the extension 86. Thus, the fore-and-aft position of the knife 50 relative to the gauge wheel 52 is maintained substantially constant, while lateral adjustment along the bar 55 is enabled by the collar 84, and a tilt of about 30° relative to the frame bar 53 can be achieved by adjustment of the bearing screw 92. For such adjustment the bolt 88 is loosened so that the plate 85 can swing and then is tightened when the correct position is obtained.

The gauge wheel 52 rides in a furrow during operation. With loose soil and where the tomatoes are growing low on the vine or even resting on the ground, the knife blade 50 is set to move below the ground up to three inches or so below the ground level. With hard soil and vines that hold their fruit high, the knife 50 may be used above ground, if desired. The adjustment is made so that the vines are cut off smartly by the blade 76 without undue impact and without uprooting and thereby without shaking the vine.

Figure 3:
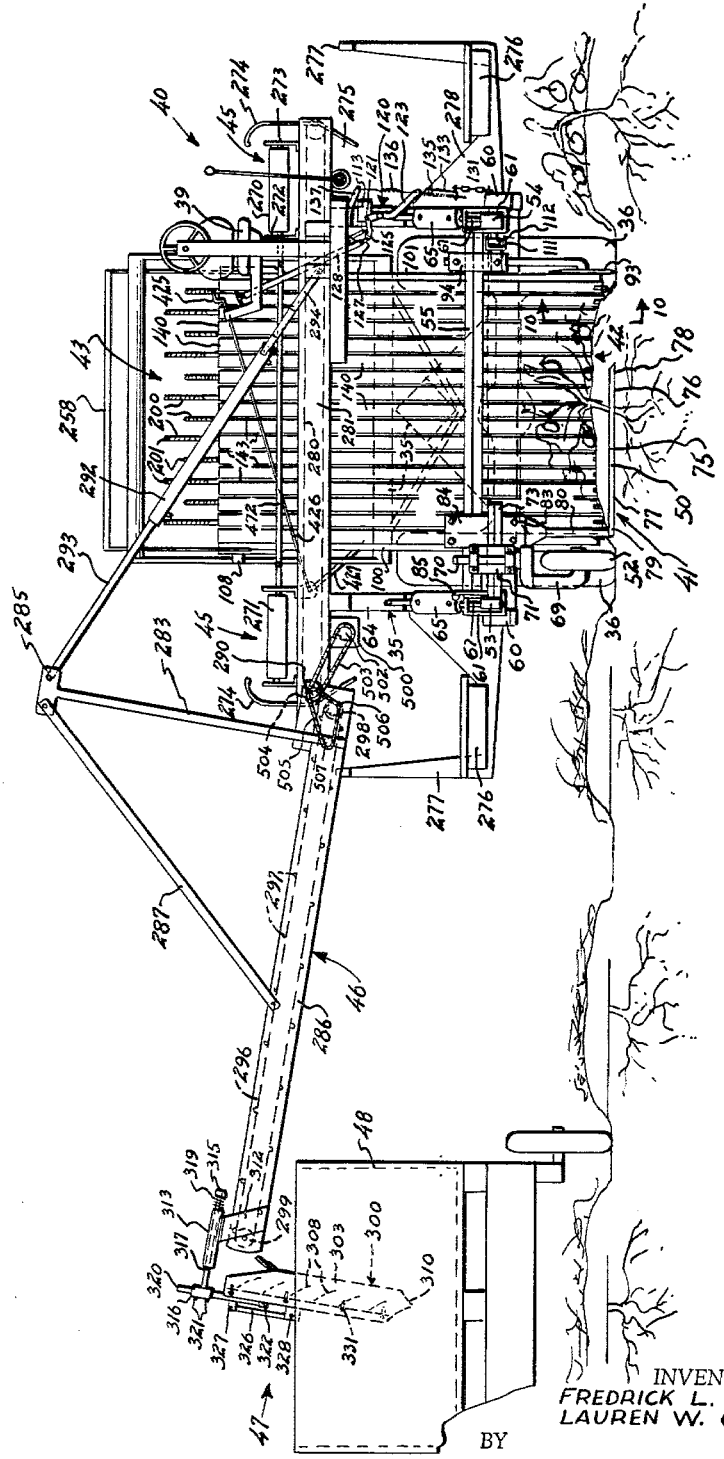
FIG. 3 is a front elevational view of the machine of FIG. 1.
Figure 4:
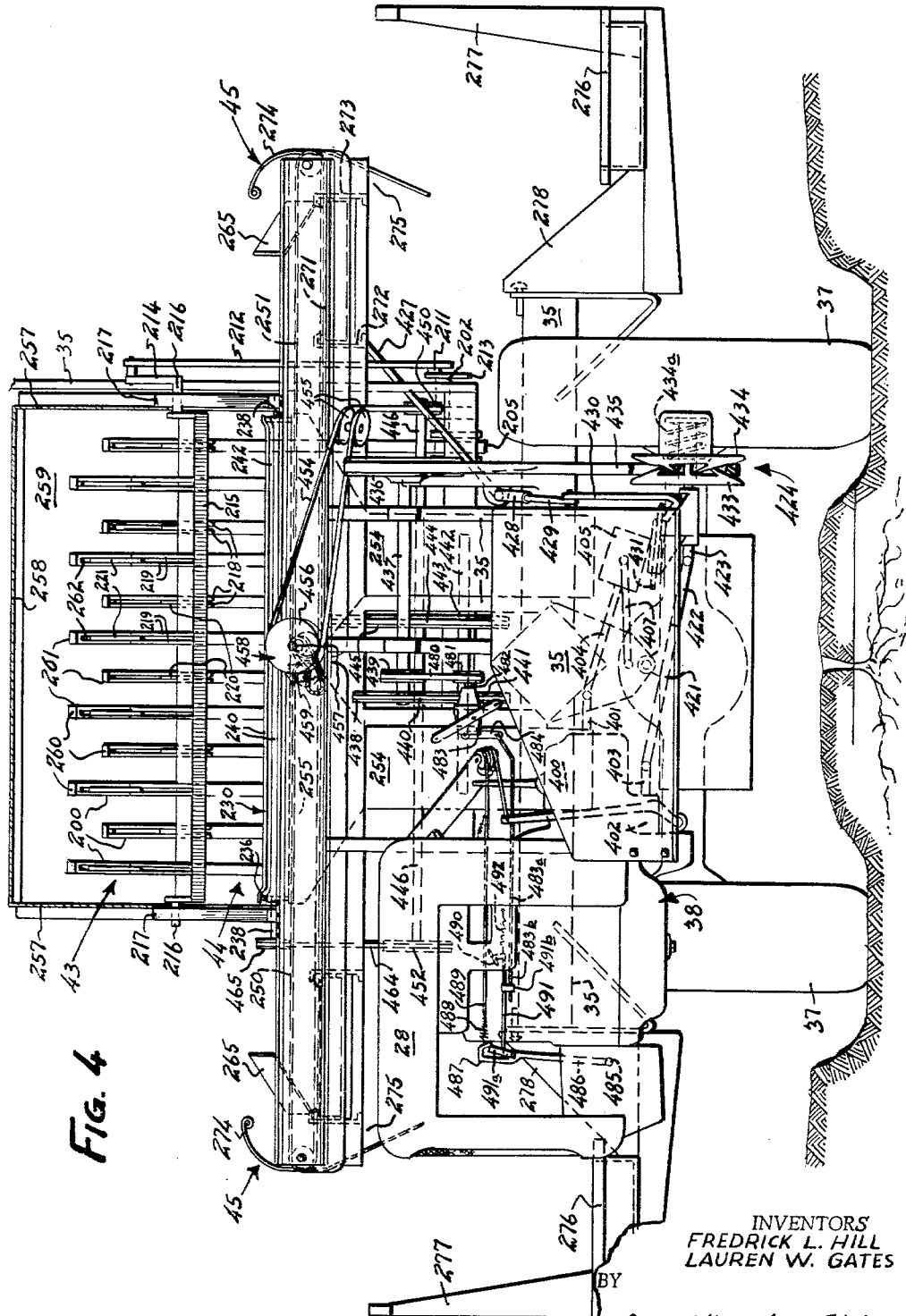
FIG. 4 is an enlarged view in rear elevation of the machine.

The vines sometimes spread out into the furrows or beyond them, getting entangled with each other. In such situations, it is desirable to provide one or more coulters 93 to cut the vine off laterally as further aid to the prevention of entanglements. The coulters 93 may be mounted by collars 94 on the bar 55 and adjusted as desired. In FIGS. 1 and 3 a coulter 93 is shown installed near the left-hand end of the bar 55, while in FIGS. 6 and 7, the coulter 93 is shown installed near the right-hand end.

Another feature of the cutter 41 is its spacing forward of the pickup unit 42 to put the vertex 75 of the blade 50 far enough forward so that its tendency to push up dirt in a "ground wave" does *not* result in sending dirt on to the pickup unit 42. In fact, an important characteristic of this invention is its ability to keep the pickup unit 42 always above ground (about two inches above ground being ideal) while the knife 50 is underground. The knife 50 is able to cut the vine underground and thereby churn up the ground while keeping the pickup unit 42 relatively clean, even in loam or clay soils. This feature will be further commented on, as will the lost-motion connection, in the following section dealing with the pickup unit 42, for the two units are closely related.

THE PICKUP MEANS 42 (FIGS. 1–3, 6, 7 AND 9–16)

The pickup unit or vine elevator 42 raises the cut vine gently and in truly vertical lift, so that there is as little shaking as possible, and deposits the vine on the shaker 43. This vertical lift is accomplished by synchronization of the elevator 42 with the ground speed of the vehicle, as explained later. Shaking in the lifting stage is to be avoided, as any tomatoes that come off the vine during lifting tend to roll down to the ground and be lost.

The unit 42 includes a pair of longitudinally extending side frame members 100 and 101 joined together by upper and lower lateral stress members 102 and 103 and a plurality of intermediate lateral stress members 104 (see FIGS. 9–16, especially FIG. 12). The stress members 104 also join two rigid frame members 105 that extend longitudinally to strengthen the frame and also perform a support function for the moving parts of the elevator, as will be explained later. The lowest of the stress members 104 is offset in between the side member 101 and the adjacent frame member 105 to avoid interference with the cam system that is explained below. At the upper end, extension portions 106 welded to the member 102 lead to bearings 107 that pivotally support the entire pickup assembly on a main frame member 108.

To each side member 100, 101 is secured a lateral extension member 110 that supports a channel-like guide 111 in which a roller 112 on the pivot axle 63 rides (see FIG. 6). Thus, when the cylinders 65 and rods 67 raise the support member 60, the pickup frame members 100 and 101 are raised without lost motion, the roller 112 enabling sliding movements at the raising points. An operator can thus raise and lower the pickup unit 42 at will without affecting the cutter unit 41 when he wants to. The cutter assembly 41 and pickup assembly 42 are raised together when the harvester is not in operation and is being moved from place to place.

This invention provides the operator with an aid by which he can return the pickup unit 42 to a desired level after it has been raised at the end of a row, so that he can put it back into operating position when he begins the next row. A preferred embodiment of this feature is shown in FIG. 15. Here is shown a control valve 113 for a pair of hydraulic fluid lines 114 and 115, shown diagrammatically as broken lines. The line 114 supplies fluid to an upper port 116 on the cylinder 65 when the pickup unit 42 and cutter unit 41 are being lowered, while the line 115 accepts fluid from a lower port 117 at that time. The action is, of course, reversed when the units 41 and 42 are raised. The valve 113 has a plunger 118 that is normally closed to the line 115.

A crank 120 is mounted on a pivot 121 adjacent the valve 113 and has two arms 112 and 123. At the end of one arm 122 is a roller 125 and at the end of another arm 123 is a notch 126. The roller 125 at this time bears against an adjustment lever 127 which is threadedly adjusted in a pivotally supported sleeve 128 by means of a handle 129. Once adjusted to a correct pickup height and knife-blade depth, the lever 127 is left in the same position relative to the sleeve 128 until further such adjustment is needed. The sleeve 128 is pivoted by a pin 130 to the frame bracket 64 or to some other portion of the main frame 35, and it has a portion 124 that is joined to the valve plunger 118 by a link 119.

A chain 131 is fastened to the support member 60 and its other end is joined to a hairpin-like wire rod 132 that extends into a bracket 133. Another hairpin-like rod 134 is hooked into the notch 126 and extends through the bracket 133. Both rods 132 and 134 have ends that are hooked around opposite ends of a spring 135 that is confined by the bracket 133. There is also a return spring 136, much weaker than the spring 135, connecting the arm 123 to a member 137 mounted on the main frame 35.

In operation, when the units 41 and 42 are being lowered, the operator takes hold of the handle 129 in order to push in the valve plunger 118 of the valve 113. When the knife blade 50 reaches its preadjustment depth and the pickup device 42 its position, the chain 131, which at first was quite loose, becomes tight and pulls on the rod 132, thereby acting to compress the spring 135, causing it to exert force on the rod 134. The rod 134 pulls on the crank 120, thereby causing the roller 125 to exert pressure on the lower end of the lever 127. The operator, sensing this pressure, may then release the handle 129, closing the valve 113, so as to hold the hydraulic cylinders 65 at the desired level. The spring 135 prevents damage to the crank 120 in case the operator chooses to hold the lever 127 down and move the support members 60 lower. When the units 41 and 42 are raised at the end of the row, the chain 131 becomes limp, and the return spring 136 then restores the crank 120 to its original position, there being no pull then exerted by the spring 135 on the arm 123.

Figure 9:
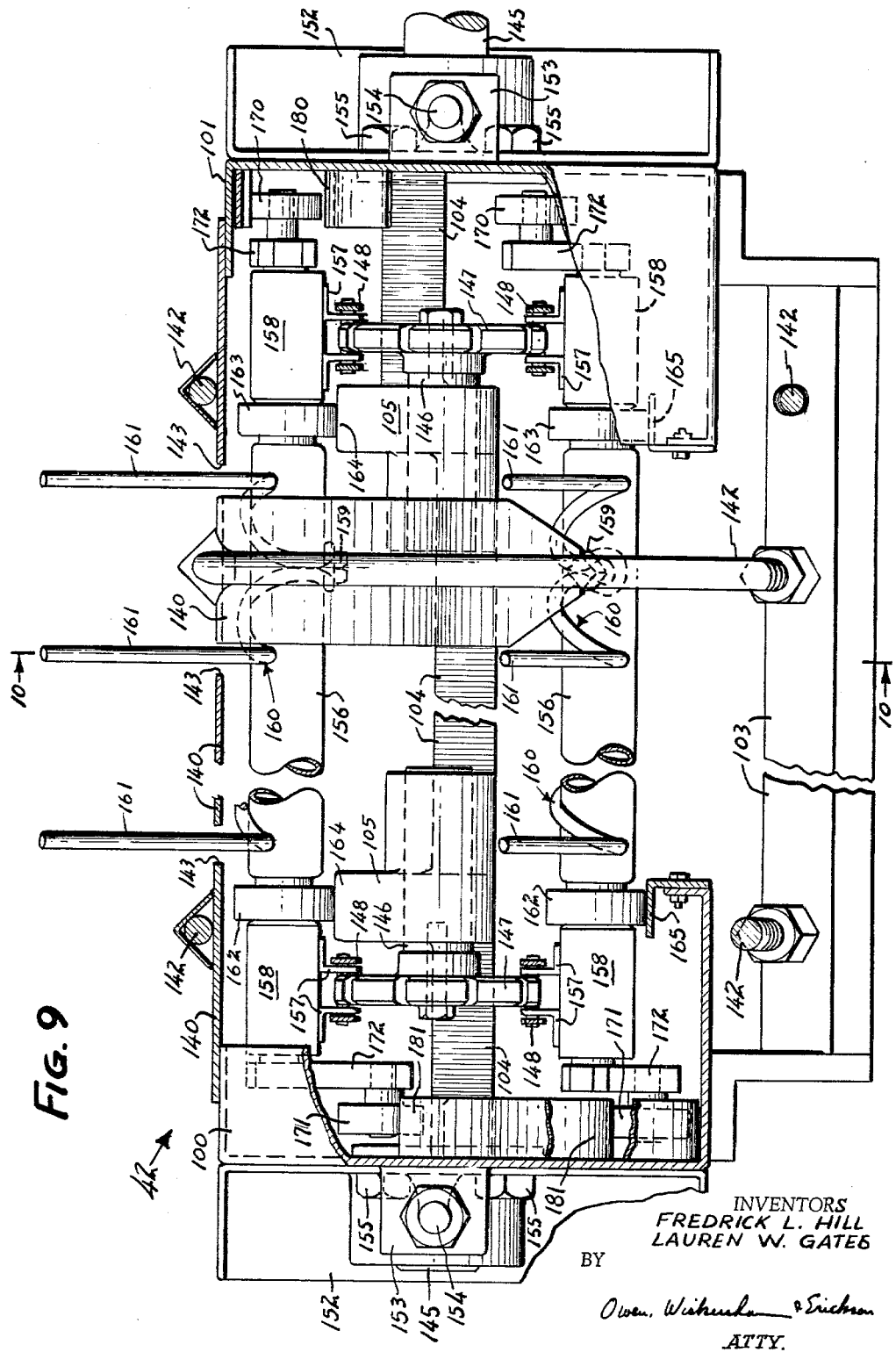
FIG. 9 is an enlarged fragmentary dead-eye view of the front end of the pickup unit, looking along planes parallel to the arrow 9 in FIGS. 2 and 10, the view being broken to omit most of the central portion while showing both sides, and some parts being cut away and shown in section.

The pickup unit 42 includes a plurality of identical longitudinally extending guide strips 140, which are side-by-side parallel to each other. They are secured near their upper ends 141 to the cross member 102, and the ends 141 overhang the front end of the shaker 43 (FIG. 11). The strips 140 include strap bolts 142 that are used to fasten the lower ends of the strips 140 to the lower cross member 103 (FIGS. 9 and 10). The strips 140 are spaced apart to provide gaps 143 between each successive pair of strips 140.

The frame members 105 support a drive shaft 145 at the upper end and stub idle shafts 146 at the lower end. The shafts 145 and 146 have sprocket wheels 147 for driving chains 148. The chains 148 are driven at the forward speed of the vehicle by an arrangement shown partly in FIG. 5 and explained in detail later.

Structure shown in FIGS. 12–14 is provided enabling the taking up of slack on the chains 148. For this purpose each of the side members 100 and 101 is made up of two pieces, a lower portion 150 and an upper portion 151. The cross members 103 and 104 join the frame members 105 to the lower portions 150, while the upper portions 151 are secured to the cross member 102. The lower stub shafts 146 are journaled to the assembly that includes the lower portions 150, while the upper or drive shaft 145 is journaled in the upper portions 151. The guide strips 140 help somewhat to tie these two portions together, but the main attachment is by outside brackets 152 and 153 that are held together a spaced distance by bolts 154, the bolt 154 being threaded into the bracket 153, which is a threaded block. Then the members 150 and 151 are locked against further movements by bolts 155 that extend through suitably slotted openings.

Between the pairs of chains 148 and moving with them are a plurality of transverse shafts 156 (see FIG. 9), which are mounted for free rotation with respect to the chains 147 by means of brackets 157 and collars 158 (FIG. 9). The shafts 156 preferably lie about three inches apart and each one is bored diametrically at loci corresponding to the center lines of every other strip 140 to receive a bolt 159. Each bolt 159 supports, with the aid of suitable nuts and washers, a tine 160 having a pair of fingers 161. Each finger 161 therefore sticks out through a gap 143, each shaft 156 therefore providing a finger 161 for every gap 143, the gaps 143 being about three inches apart. Thus, as the chains 148 are driven, the shafts 156 and their tines 160 move with the chains 148.

Each shaft 156 carries two support rollers 162 and 163, preferably of nylon, which carry the weight of the shafts 156 and their attachments. The rollers 162 and 163 ride on tracks 164 on the frame members 105 along the upper run and on tracks 165 on the flange side members 100 and 101 on the lower run. Each shaft 156 also carries two cam rollers 170 and 171, one at each end of each shaft 156 and offset with respect to the shaft axis by cranks 172. The cam rollers 170 all follow a cam track 180 in the frame member 101 while the cam rollers 171 all follow a cam track 181 in the frame member 100. Since the rollers 162 and 163 support the shafts 156, the rollers 170 and 171 simply follow their cams 180 and 181 and do not have to provide any substantial support function. The cam tracks 180 and its rollers 170 are shown in solid lines in FIGS. 10 and 11, while the cam track 181 and rollers 171, at the other side of the pickup unit 42, are shown in dot-dash lines.

The cam track 180 has a flared inlet 175 (FIG. 10) leading to an arcuate portion 176 at the forward and lower end of the side member 101 and succeeded by a long rectilinear portion 177 on the upper side of the frame member 101. The portion 177 extends to the upper end of the member 101 (FIG. 11) where a short terminal arcuate portion 178 terminates in a slightly flared outlet 179. Thus, when a roller 170 enters the inlet 175 (its associated fingers 161 then extending nearly parallel to the ground) it moves into the arcuate portion 176 and then turns the tines 160 counterclockwise so that when the cam roller 170 enters the rectilinear portion 177 the fingers 161 point upwardly and move into a position approximately perpendicular to the strips 140, preferably being slightly forwardly inclined. The rotation continues slowly along the cam 180, which diverges slightly from the chain path, so that at the top of the cam the tine fingers 161 are perpendicular to the strips 140.

The cam 181 has a flared inlet 182 which the rollers 171 enter before the rollers 170 leave their exit portion 179. The inlet 182 leads into an arcuate portion 183 which is joined to a straight portion 184 that continues for most of the lower run of the chain 148 and then leads to a short upwardly inclined portion 185 having an opening 186 on the upper side and succeeded by a short arcuate portion 187 that leads to a straight portion 188 succeeded by a dip portion 189 and a final short arcuate portion 190 having an outlet 191, which the roller 171 leaves only after roller 170 has entered its inlet portion 175, so that the cam 180 takes over from the cam 181 before the cam 181 relinquishes its rollers 181 and vice versa.

There is also very short but very important arcuate cam 183 on the frame member 101 approximately opposite the opening 186, somewhat downward and forward thereof. As the cam roller 171 follows the arcuate portion 183, it turns over about 120°, as shown, so that as it descends the portion 184 in the tine fingers 161 trail, pointing very slightly up and back. When the roller 171 enters the portion 185, it turns slightly, but as it enters the opening 186, it hesitates, as the cam 193 causes the cam roller 170 to turn over about 90°. Then the roller 171 follows down into the portions 188 with the tine fingers 161 now leading it nearly parallel to the guide strips 140. As the cam roller 171 goes into and through the portions 189, 190, and 191, it turns over another 45°, approximately, thereby insuring that the tines will not go into the ground and will pick up the vine while they are approximately horizontal.

Where the members 150 and 151 meet, there is a short gap 194. So far as the cams 180 and 181 are concerned, these gaps 194 are bridged by fingers 195 secured to the cams on the members 150 and longer than the gap so as to engage the cams on the members 151, and by similar fingers 196 on the members 151 bridging to the members 150. The side wall is bridged by similar fingers 195a and 196a.

Thus the cam system moves the fingers 161 around so that they turn over 360° during their travel, but do so in such a way that they will maintain the desired relation to the elevator 42 at each point of their travel. The main thing is that as they reach the ground at the forward end of the elevator 42, they are placed parallel to the ground and lift as they gradually tilt back and gently carry the severed tomato vine upwardly and rearwardly along the elevator 142. The fingers 161 are moving at the same speed as the frame 35 and have substantially no forward or reverse speed relative to the ground, but only a vertical upward movement. Thus, they gently lift the tomato plant vertically and carry it with the minimum of shaking to the upper end of the elevator 42, where they deposit it in the shaker 43.

As mentioned before, the elevator 42 is kept above ground where the vine alone is gently lifted, and the amount of dirt that gets on to the elevator 42 is much less than in other devices of this general nature.

THE SHAKER 43 (FIGS. 1–4 AND 16–22)

The shaker 43 includes a plurality of vertical parallel walking bars 200 with an upwardly extending undulating resilient upper surface 201. The bars 200 are made to produce a walking action by a crankshaft 202 at their forward end. The crankshaft 202 has a pair of diametrically opposite crank pins 203 and 204. The pins 203 and 204 are at the forward end of the shaker 43, and have respective forwardly extending arms 205 and 206. The two arms 205 from the pins 203 are joined by a rigid base bar 207, and the two arms 206 are joined by a second base bar 208, the arms 205 and 206 being of different lengths so that the base bars 207 and 208 never touch during operation. The base bars 207 and 208 lie beyond the front end of the shaker 43 and beneath the elevator 42 at a position never reached by tomatoes, as will be seen. Every other walking bar 200 is joined to the base bar by a connecting web 209 while the remaining (alternate) walking bars 200 are joined by a web 210 to the base bar 208.

There is also, on the right-hand side of the machine, a crank 211 lying at right angles to the crank for the pins 203 and 204 and of the same length, and to this is pivotally secured a long pitman 212. A counterweight 213 for the shaft 202 has its center of gravity directly opposite the pitman pivot at the same distance from the crankshaft 202. The pitman 212 extends to nearly the rear end of the shaker 43 and is there joined pivotally to a crank arm 214. The crank arm 214 is rigidly joined to a box beam 215, which is pivotally supported by pivots 216 on extensions 217 of the main frame 35. Along its length the beam 215 has arms 218 and 219, which alternate, each arm 218 extending forwardly and being connected to an arm 200 by link 220, while each arm 219 extends rearwardly and is connected to an arm 200 by a link 221. The arms 200 that are joined to the base beam 207 are connected to the arms 218 while the arms 200 that are joined to the base beam 208 are connected to the arms 219.

Thus, the single crankshaft 202 operates the entire walking operation of all the bars 200 and walks them in alternate pairs. The base beams 207 and 208 follow essentially circular paths and cause a point on the forward end of each bar 200 to follow a path like that shown in the curve 222. The pitman 212 causes the box beam 215 to rock back and forth and the combination of the pitman 212 and the connections to the bars 200 cause a point at the rear of a bar 200 to follow a path like those in the curves 223 and 224 in FIG. 16. The result is a shaking action that bounces the vines and shakes the tomatoes off the vine. The undulating surface 201 causes the vine to walk up the bars 200 until at their upper end the tomatoless vine falls down a slide 225 at the rear of the machine and drops on the ground. Although the walker-base-beam interconnection system translates on generally circular paths, these are adjustable, to enable more or less vertical amplitude at the rockshaft than at the crankshaft. The rear ends of the walkers may thus be made to describe slightly elliptical paths in which the major axis may lie in the line from the point in question to the crankshaft or may be at 90° thereto, depending upon whether the amplitude at 90° to that line (the amplitude which is adjustable) is less than or more than the constant amplitude along the line which contains the crankshaft.

The effectiveness of the walking bars 200 in removing fruit from the vines of any particular breed of tomato varies with the rotational speed of the crankshaft 202 as well as with its throw. The speed may be set to yield the optimum recovery of ripe fruit for any particular variety or size of vine and maintained at that speed, as will be shown later. For example, about 180 r.p.m. has worked well on some crops.

Figure 2:
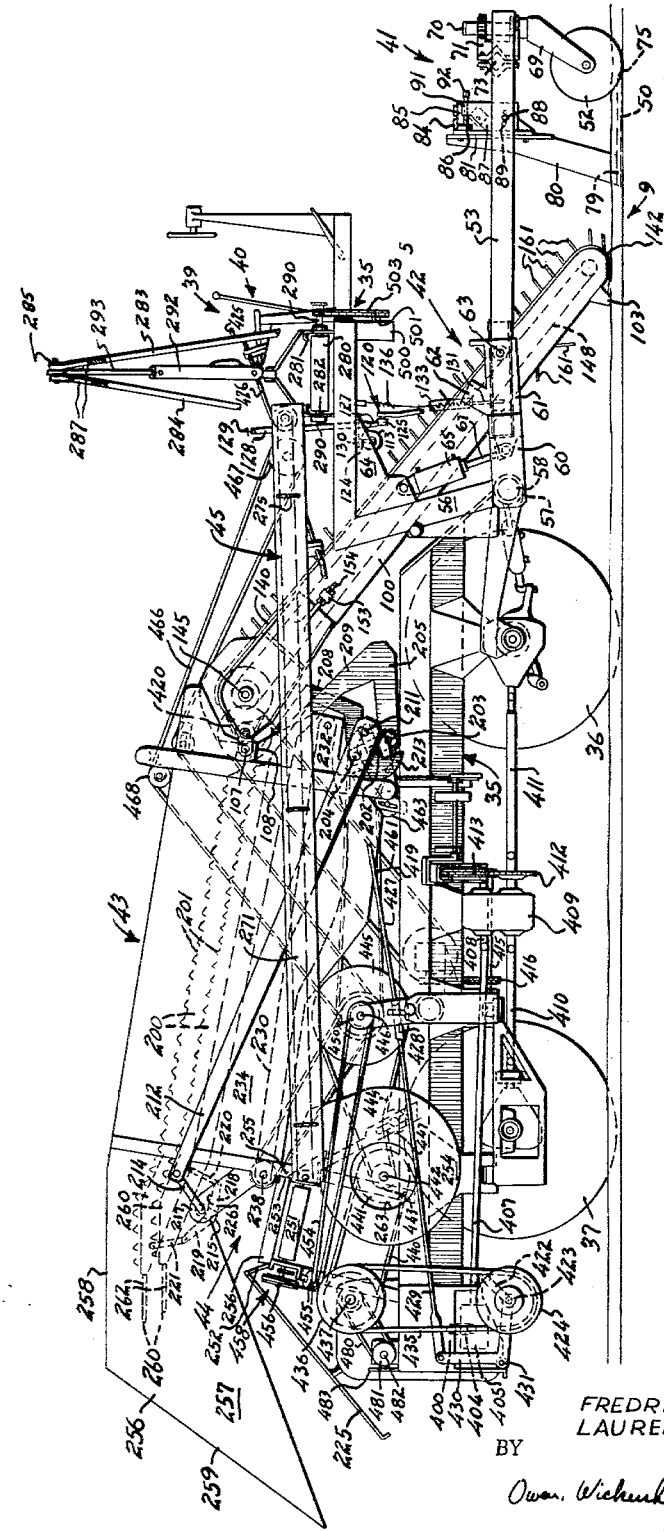
FIG. 2 is a view in side elevation of the machine of FIG. 1 with the sorters' platform and the output conveyor omitted for the sake of clarity.

As shown in FIGS. 2 and 16, the arms 209 and 210 extend downwardly and forwardly of the walking bars 200, thereby enabling the elevator or pickup unit 42 to deposit the tomatoes on the front end of the bars 200 at about the level of the end of the slide portions 141 of the strips 140. There is no movement of the walking bars 200 through the gaps 143 and hence no entanglement of the vine at this transfer point. The device smoothly transfers the tomatoes, and there is no opportunity for tomatoes to roll back to the ground once they have reached the slides 141, for even if the tomatoes come off the vine after that point, so long as they have been carried up to the slides 141, they will fall down between the walking bars 200 and be collected with the rest of the fruit that falls off at the shaker 43.

The shaker 43 separates the fruit from most of the vine, and the tomatoes fall down onto a conveyor 230 which is located just below the lowest points reached by the walking bars 200, a distance just sufficient to prevent the walking bars 200 from hitting any tomatoes resting on the conveyor 230. The short fall from the bars 200 to the conveyor 230 helps to prevent damage to the tomatoes. The forward end 231 of the conveyor 230 goes around a sprocket wheel 232 (FIG. 16) which lies forward of the forward end of the walking bars 200, the rear end of the slides 141, and the crankshaft 202, so that any tomatoes which reach the slide and fall between the bars 200 will fall onto the conveyor 230. Moreover, the conveyor 230 is enclosed within a forward wall 233, which keeps tomatoes from rolling off the lower end of the conveyor 230, and side walls 234 that also help to hold the fruit on the conveyor 230.

Details of a preferred form of the collecting conveyor 230 are shown in FIGS. 20 through 22. There are two chains 235 (cf. FIG. 5), one on each side of the conveyor 230 running around and between the sprocket wheel 232 and a rear sprocket wheel 236. A shaft 237 may connect the forward sprocket wheels 232, and a shaft 238 may connect the rear sprocket wheels 236, or both chains may be driven individually. Cross members 240 are attached to the chains 235 by means of brackets 241. The cross members 240 are preferably flattened tubular members which are wider than they are high, and they are spaced apart a distance that is closer than the diameter of the minimum size of tomatoes to be caught but far enough to enable passage of dirt and various debris through the conveyor 230. The spacing also enables the conveyor 230 to catch the tomatoes in the spaces 242 between succeeding cross members 240 and carry them up that way. To some of the cross members 240 are affixed brackets 243 which support stub shafts 244 on which are mounted rotatable rollers 245. The rollers 245, which preferably are of nylon, roll on rails 246 and support the weight of the conveyor 230 and the tomatoes on it, while the chains 235 merely advance and move the conveyor and do not have to provide any support function.

The conveyor 230 moves rearwardly and upwardly on the upper run, as shown in FIGS. 22 and 16, on a gentle slant, so as to hold the tomatoes against downhill rolling. On the lower run, there is a portion 247 where the track 246 moves down and a gap between that and a portion 248 where it comes up, leaving an opening 249 between them. Here the conveyor 230 is slack and its path drops, as shown in FIG. 16, thereby providing an automatic takeup of the chains 235 as they wear.

The upper surface 201 of the walking bar 200 is important. Instead of providing finger-like projections that are quickly worn away and that tend to damage tomatoes, the invention provides an undulating wide upper surface 201 of rubber, which advances the vines upwardly, as they could not be advanced by smooth walking bars, but does so without damage to the tomatoes and with considerably less wear on the bar surfaces 201.

Thus, it will be seen that the shaker 43 serves to advance the tomato vines rearwardly of the machine while shaking off tomatoes in a gradually increasing order of severity. The tomatoes fall down between walking bars 200 into an area that is unencumbered by other parts and land on the conveyor 230. There are no places on the conveyor 230 or between the conveyor 230 and the walking bars 200 which could damage the tomatoes, because the crankshaft 202 lies beneath the conveyor 230, and the bars 200 themselves are joined to the crankshaft 202 by the bars 209 and 210 which extend forward of the conveyor 202 without touching it. At the rear end of the device, a cover plate 226 covers the box beam 215 and prevents entanglement of the vines in the rocking device.

THE DE-LEAFER 44 AND THE TRANSFER BELTS (FIGS. 1, 2, 4, 5, 16, 23, AND 24)

The conveyor 230 moves the tomatoes rearwardly and upwardly and drops them onto a pair of transfer or cross conveyors 250 and 251 at the rear end of the shaker 43. The end of the conveyor 230 is spaced above the cross conveyors 250 and 251, although it somewhat overlaps them lengthwise. The conveyors 250 and 251 are slanted toward the front, that is, across their width, and are located closely adjacent to the slide 225, being joined to it by an upwardly extending slide portion 252.

The vertical gap 253 between the conveyor 230 and the cross conveyors 250 and 251 provides a space through which a strong current of air can be sent from a pair of blowers 254. The air coming from the blower is sent through nozzle-like outlets 225 at the gap 253 and passes through the stream of falling tomatoes as they drop from the conveyor 230 across the gap 253. The current of air is not sufficient to affect the tomatoes to any substantial degree, but it does pick up the lightweight particles of leaves and vines which have fallen down between the walking bars 200, have landed on the conveyor 230, and have not fallen out through the openings 242. The air current blows them up over the slide 252 onto the slide 225, whence they fall down with the vines and other particles that have been carried up over and fall off the rear end of the walking bars 200. The slide 225 is shielded somewhat by a shield 256 having side walls 257, a top wall 258, and a rear wall 259, and the shield 256 guides the current of air that passes from the blower 254 and through the gap 253. This helps to prevent any particles that fall from the ends 260 of the walking bars 200 from drifting back into the area over the conveyors 250 and 251 and falling on them. Also, the bars 200 have an upwardly slanted portion 261 carrying the vines above the current of air from the blower 254 onto terminal portions 262 extending out over the slide 225. Thus, the blower 254 keeps the area clear and also disposes of such debris as may remain on the conveyor 230 when it reaches the upper end of its run. The current of air is also effective even to pick up leaves and vine particles that have fallen onto the conveyors 250 and 251, although most of them never reach a quiescent state.

The blower 254 may be of the well-known vane type, in which there is an axial air inlet 263 and vanes 264 drive the air through a spiral path gradually increasing in diameter, by which the air passes to the outlet nozzle 255. The vanes 264 are driven by the engine 38.

THE SORTING STATIONS 45 (FIGS. 1 TO 5, 16, 24, AND 25)

The cross conveyors 250, 251 move outwardly from the center toward the sides and, as said before, are inclined toward the front. This inclination toward the front cooperates wth diagonal guide members 265, and the combination is used to transfer the fruit from the cross conveyors 250 and 251 to the sorting conveyors 270 and 271 that extend forwardly along the sides of the shaker 43 and much of the pickup unit 42. The transfer is shown in FIGS. 1, 2, 4 and 24, where it will be seen that the tomatoes roll forwardly down the belt 250 or 251 and are guided by the member 265 onto the substantially horizontal sorting belts 270 and 271. The rear end rollers 266 of the sorting belts 270 and 271 are movable longitudinally within the loop surrounded by the belts 250, 251, as shown in FIG. 24, by means of an adjustment slot 267, block 268, and threaded member 269 to keep the belts 270 and 271 tight without interfering with the belts 250 and 251.

The sorting belts 270, 271 move within side frame members 272 and 273 that keep tomatoes from falling over the edges, the frame members 272 lying near the shaker 43, while the frame members 273 lie on the outside. Spaced away from the members 273 are fender-like members 274, the space between them providing a disposal chute 275.

The machine is provided with side platforms 276 having protecting rails 277 and attached to the frame 35 by suitable fastening means 278. The sorters stand on these platforms 276, protected by the rails 277 and watch the fruit as it passes over the belts 270 and 271. Whenever they find fruit which is green, scarred, or damaged so that it fails to meet the standard, they simply lift it and drop it down the chute or discard trough 275 between the fender 274 and the frame 273. It falls from there directly to the ground, where it does no harm. There may be up to seven sorters on each side and they work according to any predetermined plan which will be effective.

THE OUTPUT CONVEYOR 46 (FIGS. 1 TO 3, 5, 27 AND 28)

The forward ends of both sorting conveyors 270 and 271 spill their tomatoes gently onto a front cross conveyor 280, which extends laterally across the machine from one side to the other at approximately the same forward location as the driver's seat 34. The conveyor 280, which may be of the belt type or of an open mesh metal type for cleaver operation, lies between a pair of retaining walls 281, 282 and may be level. The fruit from the conveyor 270 is carried beyond the centerline of the conveyor 280 and falls onto the forward half of the conveyor 280, whence it moves across the machine, to join with it the fruit from the conveyor 271, which is spilled into the rear half of the conveyor 280, i.e., rear of the centerline. The conveyor 280 then conveys all the fruit onto the output conveyor 46.

The output conveyor 46 extends out to one side of the machine, is supported for adjustment in the height of its outboard end. A pair of generally vertical posts 283, 284 (FIGS. 1–3) extend up from a frame member 286 of the conveyor 46 and are joined together by a member 285. A pair of rigid members 287, one on each side of the conveyor frame 286, are pivoted to the frame 286, and the frame 286 itself is pivotally joined to the main frame 35 by a hinge 290 so that the height of its outer end can be adjusted during operation. The swinging is accomplished by means of a hydraulic device that includes a cylinder 292, a piston rod 293, and anchoring members 294 that are anchored to the main frame 35 on opposite sides of the cross conveyor frame members 280 and 281. A hydraulic conduit 295 extends up to the cylinder 292.

The conveyor 46 comprises a flighted belt 296 with cross members or flights 297 that enable upward movement of the tomatoes. The belt 296 is driven at the inboard end of its loop through a roller 298 and there is a roller 299 at its outboard end. At the outboard end, the tomatoes drop off the belt 296 into the fruit depositing device 47.

THE FRUIT DEPOSITING DEVICE 47 (FIGS. 1, 3, AND 27–29)

Figure 28:
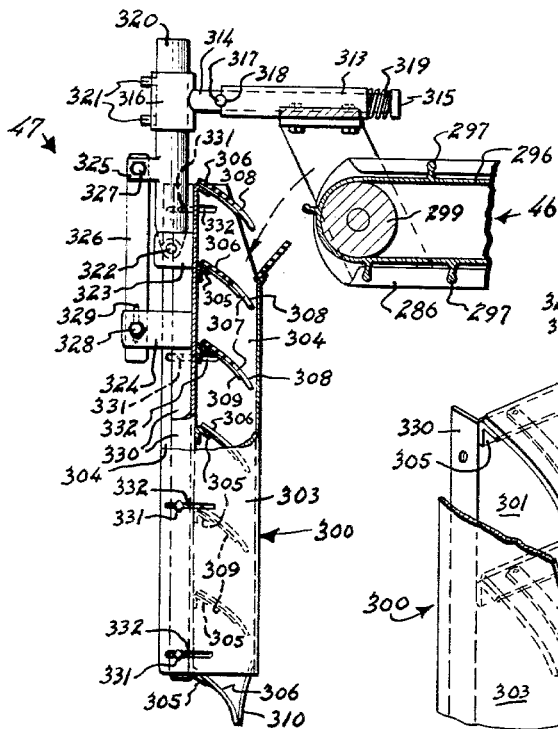
FIG. 28 is a view in section taken along the line 28—28 in FIG. 27.
Figure 29:
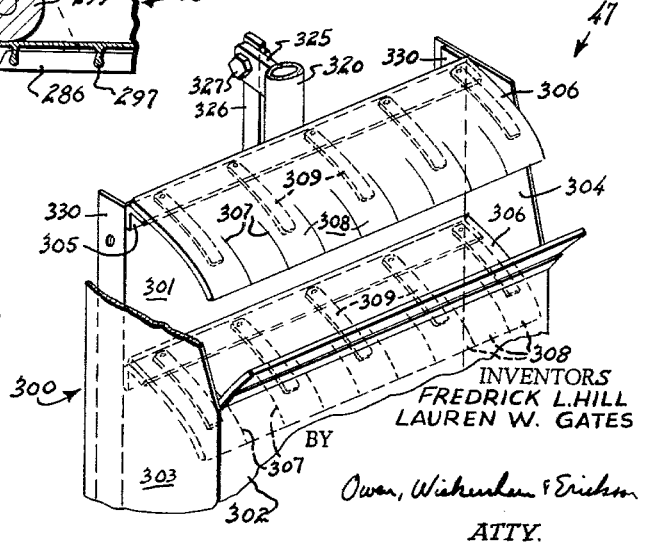
FIG. 29 is a fragmentary perspective view of a portion of the device of FIGS. 27 and 28 with portions broken away and shown in section.

The purpose of the fruit depositing device 47 is to gently place the tomatoes into the bin 48 (FIG. 3) that is moved alongside the harvester by a separate powered vehicle (not shown) and to do this with minimum damage to the tomatoes. The device 47 has a housing 300 with an outboard wall 301 and an inboard wall 302 joined by walls 303 and 304. All four walls terminate together at their lower end, but the upper end of the outboard wall 301 lies above that of the inboard wall 302; for the wall 301 lies nearly level with the upper run of the belt 296, while the wall 302 lies below the lower run of the belt 296. A series of horizontal brackets 305 are welded or otherwise secured to the outboard wall 301 at spaced intervals and each bracket 305 supports a strip 306 of belting that extends toward the wall 302, but on a downward slant, as provided by the bracket 305 and as shown in FIG. 28. Each belt strip 306 has a plurality of slits 307 extending parallel to the wall 303 and 304 from the edge facing the inboard wall 302, to provide a series of flaps 308. Beneath alternate flaps 308 are slender leaf springs 309 to provide a gentle upward pressure to keep urging the strips 306 back to their original positions. The flaps 308 are sufficiently flexible so that as the tomatoes roll against them as they roll down the inclined wall 302 (see FIG. 3), they yield downwardly to let the tomato roll down below them, and they serve to reduce the velocity of the tomatoes as they roll between the roller 299 and the bottom of the housing 300. Therefore, the tomato does not gain in acceleration during its passage through the device 47, being slowed down to nearly zero speed at each strip 306, the final fall from the bottom strip 306 starting at nearly zero speed. Opposite the bottom strip 306 is a similar strip 310 having its own slits 307, flaps 308, and springs 309, and the tomatoes drop out gently from between the strips 306 and 310 into the bin 48.

The housing 300 is supported by the frame 286 of the conveyor 46. For this purpose, a pair of arms 311 and 312 extend up and outboard from a plate 312a secured on the frame 286 so as to be adjustable lengthwise of the conveyor 46, so as to enable adjustment of the trajectory of the tomatoes as they fall from the conveyor 46 into the device 47. The arms 311 and 312 are joined by a tube 313 that lies above the belt 296, generally parallel to its axis. A rod 314 extends through the tube 313 and has an enlarged end 315 adjacent the inboard end of the tube 313 and a sleeve 316 that extends vertically from the rod's opposite end. The rod 314 can rotate in the tube 313 but is constrained against rotation by a pin 317 on the rod 314 that ordinarily lies in a recess 318 in one end of the tube 313, being urged there by a spring 319 which is compressed between the other end of the tube 313 and the rod's enlarged end 315.

A tubular post 320 extends vertically through the sleeve 316, its relative vertical position being adjustable and retained by set screws 321. The lower end of the post 320 is pivotally connected to the housing 300 by a pivot pin 322 on the post 320 journaled in a pair of ears 323 that are welded to the outside of the wall 301. Another ear 324 is welded to the wall 301 below the ears 323. Above the ear 324 there is a bracket 325 on the post 320, and a rigid link 326 is joined to the bracket 325 by a pivot bolt 327 and to the ear 324 by a bolt 328, which extends through a vertical slot 329 in the link 326. Thus, the housing 300 is supported by the tubular post 320 and is adjustable with respect to a small angle of inclination by rotation about the pivots 322 and 325 and relative movement between the bolt 328 and the vertical slot 329. This adjustment regulates the verticality of the housing 300 with respect to a vertical plane parallel to the longitudinal axis of the machine, and enables compensation with respect to the upward inclination of the outboard boom conveyor 46.

Figure 27:
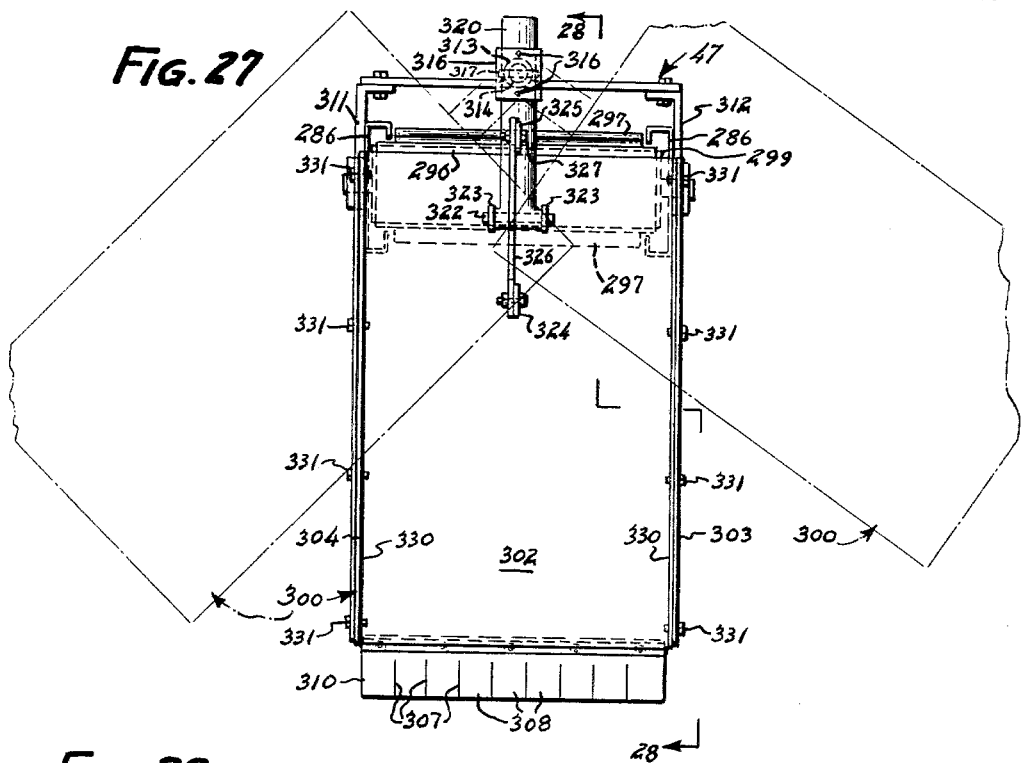
FIG. 27 is a view in side elevation taken along the line 27—27 in FIG. 3, showing the fruit-depositing device used at the end of the output conveyor.

The rotatability of the rod 314 in the tube 313 is a safety device. Normally, the spring 319, pin 317, and recess 318 urge the housing 300 to the vertical position shown in FIG. 27, but if the bin 48 is moving faster or slower than the harvester, its forward or rear wall may come against the housing 300, and then the housing 300 is swung forwardly or rearwardly against the pressure of the spring 319, as indicated by broken lines in FIG. 27.

The vertical adjustment of the post 320 in the sleeve 316 enables adjustment of the inlet to the housing 300 relative to the belt 296.

There is one further adjustment. The wall 301 has flanges 330 to which the walls 303 and 304 are secured by bolts 331 that extend through horizontal slots 332 in the walls 303 and 304. Thereby, the distance between the walls 301 and 302 can be adjusted to compensate for average fruit size, this of course also adjusting the distance between the wall 302 and the flaps 308.

THE DRIVE SYSTEM (FIGS. 1–5, 16, 23, AND 26)

The harvester has some unusual requirements of a drive system: (1) the pickup unit 42 has its chains 148 so driven that the rearward movement of the tines 160 exactly balances the forward movement of the frame 35 and pickup unit 42; (2) the walker 43, the various conveyors, and the blower 254 move at constant speed, for variation of their speed affects their efficiency adversely; (3) different elements require different constant speeds.

A novel speed control system is provided so that the speed of the vehicle and of the chains 148 can be changed while kept in balance and without changing the speeds of the constant speed mechanisms.

The engine 38 is provided with a transmission 400 from which extends an engine drive shaft 401. The transmission 400 drives a power takeoff unit 402, having an internal clutch controlled by one of the controls 40. A power takeoff shaft 403 extends from the unit 402. Basically, the shaft 401 drives the vehicle and the pickup chains 148, while the shaft 403 drives constant speed mechanisms, but the connection between them is quite novel. Before describing it, each system will be separately outlined.

The engine shaft 401 acts through a shaft 404 to an angle gear box 405 from which a series of shafts 406, 407, and 408 (FIG. 5) extends to a transfer case 409. From the transfer case 409 extends a rear drive shaft 410 and a front drive shaft 411 that respectively drive the rear wheels 37 and front wheels 36 in a four-wheel drive system.

For the pickup chains 148, a drive gear 412 on the front drive shaft 411 drives a laterally extending chain 413 which can be lifted out of engagement with the gear 412 by a clutch. The chain 413 drives a shaft 415, which in turn drives a chain 416 through an overriding clutch arrangement of a type well known in the art, or other mechanism capable of transmitting torque in only one direction, so that a reversal of the vehicle will not drive the chains in reverse. A slip clutch or torque-limiting device integral with the sprocket which drives chain 419 serves to protect the drive and the pickup from excess input torque if the pickup becomes fouled or is otherwise rendered immovable. An angle gear box 418 transmits the drive from the chain 416 to a chain 419 and can adjust the gear ratio to compensate for the angle at which the chain 148 lies, so that the horizontal component of the chain 148 will move at the same speed backward as the forward speed of the wheels 36 and 37. The chain 419 drives a chain 420, which, in turn, drives the shaft 145 that drives the chain 148.

It is apparent that when the chain 413 is engaged with the gear 412, the chains 148 are driven and that, when driven, the chains 148 move rearwardly at the same speed at which the frame 35 moves forwardly, whatever that speed may be.

The power-take-off shaft 403 rotates a shaft 421 to which is splined a shaft 422 (FIG. 26), and the shaft 422 drives a shaft 423 on which is mounted an adjustable pulley 424. The driver has, adjacent his seat 39, a crank 425 (FIGS. 1 and 2) from which a rotatable shaft 426 extends. The shaft 426 rotates a shaft 427 that has a collar 428 threaded around a rod 429, so that when the driver turns the crank 425, he brings forward or moves back a crank arm 430 attached to the rear end of the rod 429. As shown in FIG. 26, when the crank arm 430 swings around its pivot 431, its other arm 432 moves the shaft 423 up and down. The pivot 431 is set on an angle with respect to the shaft 423, so that movement of the crank arm 430 causes the arm 432 and the shaft 423 to move laterally as well as vertically. This action is transmitted to the pulley 424, which has two sides 433 and 434 (see FIG. 4) urged toward each other by a spring 434a. Lowering the arm 432, shaft 423, and pulley 24 causes the pulley members 433 and 434 to pull harder against a belt 435, for the other end of the belt 435 is fixed by passing around a constant-diameter pulley wheel 436. The increased pull on the belt 435 enables the belt 435 to overcome some of the pressure of the spring 434a and to move in closer to the shaft 423, thereby forcing the members 433 and 434 somewhat apart and resulting in making the circumference of the belt-engaging portion of the pulley 424 shorter. This, in turn, changes the ratio between the wheels 424 and 436 and drives the wheel 436 relatively slower. When the arm 432, shaft 423, and pulley wheel 424 are raised, the spring 434a forces the belt 435 to move around a large circle, tending to drive the wheel 436 faster. The shift laterally of the arm 432, shaft 423 and the pulley member 433, due to the angle at which the pivot 431 is inclined, causes the member 433 to move toward (or away from) the member 434 half of the distance by which the spring 434a moves the member 434, thereby keeping the belt 435 straight and keeping the periphery of the wheel 424 engaged by the belt 435 always in the same plane as the pulley 436.

The pulley wheel or sheave 436 is mounted on a shaft 437, through which it drives sheaves 438 and 439. The sheave 438 drives a belt 440 and through it a sheave 441 and shaft 442; the shaft 442 directly drives the vanes 264 of the blowers 254 and also drives a sheave 443. A belt 444 transmits drive from the sheave 443 to a sheave 445 on a shaft 446, a takeup idler roller 447 being provided for adjusting the tightness of the belt 444. The shaft 446 carries a plurality of sheaves 450, 451 and 453, as well as the sheave 443.

The sheave 450 acts through a belt 454, angle idler 455, and sheave 456 to drive a shaft 457 that directly drives one of the rear cross conveyors 251. A chain reversing mechanism 458 (FIG. 23) transmits this drive from the shaft 457 to a shaft 459 that drives the other rear cross conveyor 250.

The sheave 451 acts through a belt 461 and sheave 462 to drive the crankshaft 202 for the walker 43. How the crankshaft 202 operates the walker 43 has already been described. An idler 463 enables tightening of the belt 461.

The sheave 452 drives a belt 464 and through it a sheave 465 on the shaft 236. The shaft 236 drives the chains 235 for the tomato collecting conveyor 230, in a way previously described.

The sheave 453 drives a belt 466 that drives a sheave 467, the belt 466 being tightened by idlers 468. The sheave 467 is mounted on a short shaft 469 that has a sprocket wheel 470 for driving a chain 471 and thereby drives a shaft 472. On the shaft 472 are rollers 473 and 474 which, respectively, drive sorting conveyor belts 270 and 271.

Thus, the blowers 254, the walking bars 200 and their crankshaft 202, and each of the conveyors 230, 250, 251, 270, and 271 are driven by the shaft 437, which in turn is driven by the power take-off shaft 403 through the adjustable pulley wheel 424. The shaft 437 also carries the sheave 439, which drives a belt 480 and a sheave 481 on a shaft 482. The shaft 482 operates an auxiliary engine governor 483 which moves a lever arm 484 (FIG. 4) when the speed of the shaft 482 is greater than the amount for which the governor 483 is set. This action moves a rod 483a to the left in FIG. 4; slowing down of the shaft 482 causes movement of the rod 483a to the right.

The engine 38, e.g., a Ford engine, is provided with an integral governor of a well-known type, having an output shaft 485 to which a governor arm 486 is attached. The upper end of the governor arm 486 carries a lost-motion device 478, which is connected by a spring 488 to a throttle rod 489 operated at the control center 40. Usually the engine is run with the throttle control fully open, letting the governor set the engine speed. The actual throttle may be a butterfly valve 490 connected to the governor and operated by a rod 491 which is connected to a pivoted block 491a. The block 491a is in contact with the lost-motion device 487 and is normally pulled thereagainst by a very light spring 492. However, when the rod 483a moves to the left, a projection 483b thereon engages a block 491b that is rigidly mounted on the rod 491 and moves the rod 491 to the left without affecting the lost-motion device 487. At other times, the rod 483a moves through a hole in the block 491b without effecting movement of the block 491b or rod 491, but at those times (when the projection 483a engages the block 491b), the butterfly valve 490 is controlled by the auxiliary governor 483 and is therefore regulated to keep the shaft 437 turning at a constant speed.

A novel feature of the drive is that when the operator is harvesting tomatoes, he runs the engine at full throttle, and when he wants to change the speed of the vehicle and of the pickup conveyor, he turns the crank 425 so as to bring the crank arm 430 forward. This makes the effective diameter of the pulley wheel 424 smaller, thereby temporarily slowing down the belt 435 and therefore tending to slow down the shaft 437 and all the devices depending on that shaft. However, the tendency of the sheave 439 on the shaft 437 to slow down the speed of the shaft 482 causes the auxiliary governor 483 to move the rod 483a to the right (FIG. 4), and its projection 483 engages the block 491b and moves the rod 491 to the right. Movement of the rod 491 to the right opens the throttle 490 to run the engine 38 at a higher speed which exactly balances the slowing down of the shaft 437. The engine 38 drives the pulley wheel 424 faster and as a result the shaft 437 and all the devices driven from it continue to move at the same speed. But meanwhile, the increased engine speed acts to drive the wheels 36 and 37 and the chains 148 at a higher speed. Similar action takes place, in reverse directions, when the operator slows down the vehicle.

Figure 30:
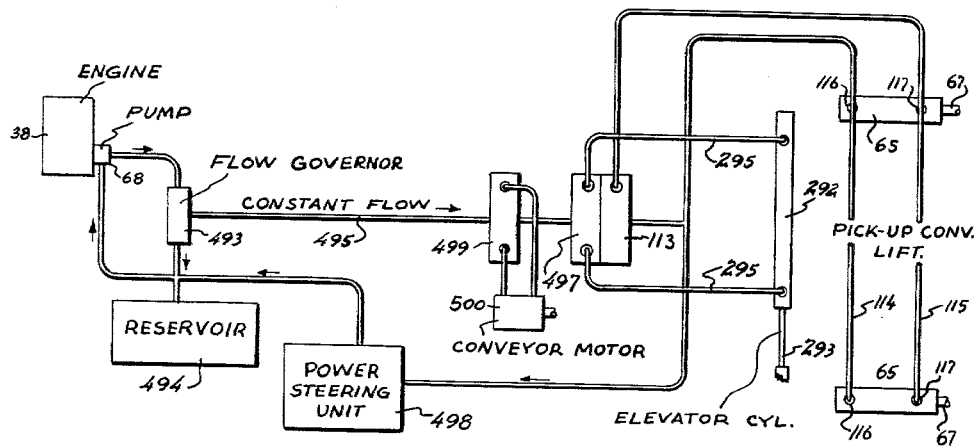
FIG. 30 is a diagram of the hydraulic circuit for the device.

The engine 38 also drives the hydraulic circuit, which is shown diagrammatically in FIG. 30, through an engine-driven pump 68. Constant flow is obtained by the pump 68 sending all the hydraulic fluid to a flow governor 493, excess fluid being returned to a reservoir 494, whence fluid is supplied to the pump 68. Thus, no matter what the speed of the engine is, the output conduit 495 from the flow governor 493 supplies a constant volume of fluid to all the hydraulic devices.

Connected to the conduit 495 are valves 113 and 497, which are respectively used for the lifting cylinders 65 that control the heights of the pickup unit 42 and cutter unit 41 and for the elevator cylinder 292 that controls the raising and lowering of the output conveyor 46. There is also a power steering unit 498 in the same circuit, of a suitable conventional type, for steering the vehicle, and a valve 499 for driving a fluid motor 500 mounted on the frame 356 (see FIGS. 1–3 and 5).

The motor 500 drives the front conveyor 280 and the conveyor belt 296 of the output conveyor 46. To do this, the motor 500 drives a shaft 501 on which is a sprocket wheel 502. The wheel 502 drives a chain 503 which engages a sprocket wheel on the pivot shaft 290. The shaft 290 directly supports a drive roller 504 for the front conveyor 280. Another sprocket wheel on the shaft 290 drives another chain 505 that engages a sprocket wheel 506 on the shaft of the drive roller 298 for the belt 296. A take-up sprocket 507 keeps the chain 505 properly taut for all positions of the conveyor 46. Thus the front conveyor 280 and output conveyor belt 296 always move at the same speed, driven by the hydraulic system.

*Operation*

The harvester is self-propelled by its engine 38 driving all four wheels 36 and 37 with the operator at his control station 40 and provided with the usual steering and braking devices as well as the special mechanisms which have been described earlier. Once the machine has harvested one or more rows of tomatoes, it always moves beside the left-hand side of a harvested row. In other words, looking at FIG. 1, the portion still to be harvested would be on the left of the machine and the portion already harvested lies on the right. For the first row, of course, this is not feasible, but once that has been harvested, the pattern is begun. Often the machine will first harvest a row down approximately the middle of the field and a second row at one end of the field and then will move in a loop, with the machine moving forward to the left of already harvested adjacent rows.

As the machine approaches the field and moves along the highway, its output conveyor 46 is normally raised as high as possible to take up a minimum of room, and the depositing device 47 is normally taken off and carried along somewhere on the machine. The clutches are disengaged so that none of the conveyors, the blower 254, or the walking bars 200 are moving. The clutch for the pickup chains 148 is also disengaged, and both the pickup unit 42 and the cutter unit 41 are elevated well above the road.

After the machine leaves the highway into the field to be harvested, the operator actuates the hydraulic cylinder 65 so as to lower the pickup unit 42 and the cutter unit 41 to their proper positions. The V-shaped knife 50 is lowered and, if necessary, is properly adjusted laterally and vertically with respect to its gauge wheel 52 by movement of the bracket 70 relative to the vertical shaft 70 and the lateral stub shaft 73. The knife blade 50 is adjusted laterally along the shaft 55 and, with the cutting device 41 lowered, is given the proper tilt, if it has not been already set, by use of the adjusting screw 92 and the tightening screw 88. One or more coulters 93, if used, are installed. The relative position desired between the cutting unit 41 and the elevator 42 is also determined; normally the knife blade 50 will be about three inches below the ground and the shoes 144 on the elevator unit 42 will be about two inches above the ground. At this time, the operator also uses the hydraulic cylinder 292 to erect the output conveyor 46 into the position shown in FIG. 3, and the fruit depositing device 47 is installed in place. The sorters take their places on the platform 276, and the operation is ready to commence.

With the engine governor 485 set at a desired speed, the operator can now engage the clutches. Upon engagement of the chain 413 with the gear wheel 412, the chains 148 of the pickup unit 42 begin moving the tines 160 along their paths. Upon engagement of the power take-off unit 402, the shaft 437 is driven, and the operator can turn the crank 425 to adjust the forward speed of the frame 35 and the backward speed of the chains 148 while leaving constant the speed of the conveyors and other constant-driven parts. As he then starts along the row, all the moving devices are driven by the engine 38 with the hydraulic devices ready for control by the operator as he needs them.

The machine moves along a row with its tires 36 and 37 in the furrows, while the bin 48 is moved by a separate tractor or suitable device, preferably two furrows away, as shown in FIG. 3. The harvester advances with the vertex 75 of the blade 50 to the right of the trunk or main stem of the tomato plant, as shown in FIG. 1, so that the blade portion 76 cuts the stems of the vines. As it moves below the ground, the blade 50 creates a ground swell, which subsides before the pickup unit 42 reaches that point, so that no dirt gets thrown on the pickup unit 42. As he moves along, the operator notes the proper blade height and elevator height and from time to time moves the pickup unit 42 up and down to the proper elevation. Because of the lost-motion connection between the units 41 and 42, he can do this without affecting the height of the blade 50. As the blade 50 cuts off the vine with its portion 76, any entanglement that might take place on the blade portion 76 cannot occur, for the vine almost immediately passes off at the end 78 of the blade 50. Since the vine is operating below ground, very little entanglement takes place with the blade portion 77, and such as does trails off at the end 79.

The pickup unit 42 engages the cut-off vine at about the point where the ground swell stops, or shortly thereafter. Its tines 160 move as shown best in FIG. 10; the tines 160 have their fingers 161 gradually moving to a position approximately parallel to the guide strips 140 as the fingers 161 approach the ground and then the fingers 161 swing until at the forward limit they lie horizontal. It is in this position that they generally pick up the vine and begin lifting it, gradually but slowly, to a forwardly and upwardly inclined position. The upward inclination enables them to be sure to pick up the vines; a perpendicular position at this time is not necessary and has a positive disadvantage in that too quick a shift of movement of the tines 160 could start shaking the vines somewhat. When moved according to the pattern shown in FIG. 10, the vine is lifted substantially vertically, because the backward speed of the tines 160 exactly belances the forward speed of the main frame 35 and therefore of the frame of the pickup unit 42; as far as the vine is concerned, it is simply being gently lifted vertically relative to the ground. As the vine is moved up and back along the pickup unit 42, the fingers 161 are gradually straightened up until by the time they reach the top, they are substantially perpendicular to the guide strips 140 as shown in FIG. 11. At this point the vines are moved over to the slide portion 141 and they can then roll down the slide 141, being given some final pushes by the fingers 161 as they turn around at the top of their run. The fingers 161 are then carried by their cams 180 and 181 down into the lower run and progress as described under the section, completing the rest of their turn so that they will be in position to again pick up the vines when they reach the lower end.

The vines slide down the slide 141, which is purposely tilted at a steep angle to encourage them to slide, and if any tomatoes fall off at this point, they too roll down the slide 141 so that there is no problem in collecting them. The slide 141 overhangs the shaker unit 43 and deposits the vines on the walking bars 200 at approximately no change in elevation when they fall off. ("Approximately" means that the walking bars 200 are constantly moving up and down; it is not a transfer to a still object but to a moving one.) The tomatoes that have fallen off during their passage down the slide 141 fall directly between the bars 200 and if they should hit the upper surface 201 of one of the bars 200, they are not damaged because it is elastomeric and has no sharp angles. When the tomatoes fall down between the bars 200, they meet no obstruction, but land on the conveyor 230 a very short distance below the bars 200, without a severe drop. If they should tend to roll down and forward after falling between the walking bars 200, they are caught by the front wall 233 and start moving up the conveyor 230, taking a position in between succeeding pairs of cross members 240. Dirt which falls down also falls onto the conveyor 230 but generally falls between the members 240 at the spaces 242, and mainly, after passing through both runs of the conveyor 230, onto the ground over which the harvester is passing.

The walking bars 200, moved by their crankshaft 202 with the aid of the pitman 212, are set to translate according to the paths 222 at the forward end and 223 and 224 at the rear end. The tomatoes are therefore shaken off the vine with a gradually increasing action, and by the time they reach the end of the portions 201, the tomatoes have substantially all been shaken off the vine and have fallen onto the conveyor 230, as described. The absence of obstruction due to the positioning of the crankshaft 202 below the conveyor 230 and the use of the arms 209 anod 210 to make this possible, the smooth transfer from the slide 141 to the bars 200 without any opportunity for the tomatoes to fall elsewhere than on the conveyor 230, all enhance operation at this point. The vines continue to move back, and having left all their tomatoes, move up the inclined portions 261 onto the terminal portions 262 and fall off the ends 260 and down onto the slide 225. From there, the vines drop out of the machine onto the ground, leaving each vine at approximately the same position where it was picked up.

The tomatoes are brought up the conveyor 230 along with some small leaves and plant bits, but almost all the dirt has already dropped off through the conveyor 230. As they reach the upper end of the conveyor 230, the tomatoes fall into the tilted rear cross conveyors 250 and 251 across the gap 253, while the blowers 254 send a strong current of air through them, carrying the plant debris, leaves, stems, and so on, up the slide 252 onto the slide 225. The blown current of air is guided by the shield structure 257 so that it goes down the slide and prevents any plant bits from drifting back onto the conveyors 251. The tomatoes, as they move out across the conveyors 250 and 251, are therefore substantially clean of plant debris.

The cross conveyors 250 and 251 then carry the tomatoes out to and deposit them gently on the sorting conveyors 270 and 271. The sorters, standing on the platforms 276, look at all the tomatoes carefully and throw the discards down into the discard chute 275. The sorted tomatoes then pass forward to the cross conveyor 280 at the front of the machine. Those from the conveyor 270 move all the way across the machine, are joined at the opposite side of the machine by the tomatoes from the sorting conveyor 271, and with them, are carried onto the output conveyor 46. The flight members 297 help to carry the tomatoes uphill, as shown in FIG. 3, over to the fruit depositing device 47. The tomatoes fall off the end of the belt 296 and fall from strip 306 to strip 306 of the slitted belting down into the bin 48, dropping with minimum velocity from the lower end of the device 47. As the tomatoes gradually stack up in the bin, the conveyor 46 can be raised, the device 47 being usually at its lowest position at the commencement of operation so that the tomatoes will not have so far to drop. The driver of the vehicle pulling the bin 48 tries to adjust his speed to exactly that of the harvesting device, but if he fails to, the safety swing of the device 47 prevents damage to the device 47 and to the conveyor 46 by enabling the device 47 to swing on an angle temporarily until the speed is properly adjusted. The device 47 is adjusted to accommodate the proper size of tomatoes and to obtain the proper angle by means that have been described earlier.

When the operator comes to the end of a row, he actuates the hydraulic cylinder 65 to raise both the pickup unit 42 and the cutter unit 41. When he re-enters a row after having already harvested one row and therefore having obtained the proper cutting depth of the blade 50 and proper relation of the cutter unit 41 to the pickup unit 42, he operates the handle 129 and tube 128 to place the feeling member 127 against the roller 125 as he hydraulically lowers the units 41 and 42, and when he feels pressure against the handle 129, he knows that the units are at their proper depth and promptly releases the control.

The tomatoes are thus mechanically harvested with great efficiency and are moved from the growing vine to the bin 48 with only the sorting being carried out by hand and even that being considerably speeded up and improved by the machine.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. In a tomato harvesting machine, the combination of
   a main vehicle frame having supporting wheels and self-propelling means,
   a cutter frame carrying vine-severing means adjacent its forward end,
   pickup means for engaging severed vines at its forward end and elevating them to its rear end,
   raising and lowering means on said main frame for lifting and lowering the forward end of said pickup means relative to said main frame, and
   a lost-motion connection between said raising means and said cutter frame for lifting and lowering said cutter frame, enabling relative movement of said raising means to said cutter frame.

2. The combination of claim 1 having
a rigid member pivotally mounted on said main frame and having a rigid extension for actuating said raising and lowering means and a sensing end,
a crank pivotally mounted on said main frame and having one arm adapted to engage said sensing end when said extension engages said plunger, and a second arm,
a flexible member connected to said pickup frame, and
spring means connecting said flexible member to said second arm,
whereby the operator can sense through said rigid member when said cutter frame reaches a predetermined position which sends through said spring means a force tending to push said first arm against said sensing end.

3. The combination of claim 1 wherein
said raising and lowering means is hydraulic and includes a valve having a plunger,
a rigid member pivotally mounted on said main frame and having a rigid extension for engaging said plunger so as to open said valve and a sensing end,
a crank pivotally mounted on said main frame and having one arm adapted to engage said sensing end when said extension engages said plunger, and a second arm,
a helical spring,
first means extending through said spring, engaging one end and extending beyond the other end and attached to said second arm,
second means extending through said spring and engaging said other end and extending said one end,
a chain link connecting said second means to said pickup frame,
whereby the operator can hold said hydraulic valve open as said pickup frame is lowered and can sense through the handle when said frame reaches a predetermined position which places the chain in tension and sends through said spring a force tending to push said first arm against said sensing end.

4. In a tomato harvesting machine, the combination of
a main vehicle frame having supporting wheels and self-propelling means,
a cutter frame carrying vine-severing means adjacent its forward end,
pickup means for engaging severed vines at its forward end and elevating them to its rear end,
raising and lowering means on said main frame for lifting and lowering the forward end of said pickup means relative to said main frame,
means for predetermining a desired harvesting position,
a lost-motion connection between said raising means and said cutter frame for lifting and lowering said cutter frame, enabling relative movement of said raising means to said cutter frame, and
means for sensing said predetermined position of said pickup means relative to said main frame.

5. In a harvesting machine, the combination of
a main vehicle frame having supporting wheels and self-propelling means,
pickup means for engaging the product being harvested at its forward end and elevating them to its rear end,
raising and lowering means on said main frame for lifting and lowering the forward end of said pickup means relative to said main frame,
control means for said raising and lowering means including an operator-controlled handle,
means for predetermining a desired harvesting position, and
means for applying a resistive force to said handle when said pickup means is lowered to said predetermined position.

6. The combination of claim 5
wherein said control means includes a rigid member pivotally mounted on said main frame and having a rigid extension for actuating said raising and lowering means and a sensing end, said handle being part of said rigid member,
and wherein said means for applying resistive force is:
a crank pivotally mounted on said main frame and having one arm adapted to engage said sensing end when said extension engages said plunger, and a second arm,
a flexible member connected to said pickup frame, and
spring means connecting said flexible member to said second arm,
whereby the operator can sense through said rigid member when said cutter frame reaches a predetermined position which sends through said spring means a force tending to push said first arm against said sensing end.

7. In a tomato harvesting machine, the combination of
a main vehicle frame having supporting wheels and self-propelling means,
a cutter frame carrying vine-severing means and having two parallel longitudinal frame members extending to the rear of said severing means,
pickup means for engaging severed vines at its forward end and elevating them to its rear end,
said pickup means having a frame connected to said main frame at its rear and upper end by a lateral horizontal pivot and having a pair of forwardly extending side frame members,
a pair of parallel support arms journaled to said main frame for relative rotation, each arm having a longitudinal forwardly extending portion,
pivot means pivotally connecting each said cutter frame member to its said arm,
means rollingly connecting each said arm to said side frame members for lifting the forward end of said pickup frame about its pivot when said channel portions of said support arms are lifted about their journals,
means for lifting and lowering said support arms, and
lost-motion means for engaging said cutter frame members and lifting them after a predetermined lifting movement of said support arms.

8. The combination of claim 7 wherein
said means for lifting and lowering said support arms is hydraulic and includes a valve having a plunger,
a tubular sleeve pivotally mounted on said main frame and having a portion thereof interiorly threaded and having a rigid extension for engaging said plunger so as to open said valve,
threaded means extending through the length of said sleeve having a handle at its upper end and a sensing end projecting through said tube an amount adjustable by virtue of the threading,
a crank pivotally mounted on said main frame and having one arm adapted to engage said sensing end when said extension engages said plunger, and a second arm,
a helical spring,
first means extending through said spring, engaging one end and extending beyond the other end and attached to said second arm,
second means extending through said spring and engaging said other end and extending said one end, and
flexible means connecting said second means to said pickup frame,
whereby the operator can hold said hydraulic valve open as the cutter frame and pickup frame are lowered and can sense through the handle when said frames reach a predetermined position which tightens said flexible means and sends through said spring a force tending to push said first arm against said sensing end.

9. In a tomato harvesting machine, the combination of a main vehicle frame having supporting wheels and self-propelling means, a cutter frame carrying vine-severing means and having two parallel longitudinal frame members extending to the rear of said severing means, pickup means for engaging severed vines and elevating them, said pickup means having a frame connected to said main frame at its rear by a lateral horizontal pivot and having a pair of forwardly extending side frame members with roller-engaging track means, a pair of parallel support arms journaled to said main frame for relative rotation, each arm having a longitudinally extending channel portion extending forwardly, in each of which one of said cutter frame members rides, pivot means pivotally connecting each said cutter frame member to its said channel and extending therebeyond and having rollers engaging said track means for lifting the forward end of said pickup frame about its pivot when said channel portions of said support arms are lifted about their journals, hydraulic means for lifting and lowering said support arms, and a stop bridging said channels for engaging said cutter frame members in a lost-motion connection.

10. The combination of claim 9 wherein said hydraulic means includes a valve having a plunger, a tubular sleeve pivotally mounted on said main frame and having a portion thereof interiorly threaded and having a rigid extension for engaging said plunger so as to open said valve, threaded means extending through the length of said sleeve having a handle at its upper end and a sensing end projecting through said tube an amount adjustable by virtue of the threading, a crank pivotally mounted on said main frame and having one arm adapted to engage said sensing end when said extension engages said plunger, and a second arm, a helical spring, a bracket for maintaining said spring under compression, first means extending through said spring, engaging one end and extending beyond the other end and attached to said second arm, second means extending through said spring and engaging said other end and extending said one end, a chain link connecting said second means to said pickup frame; and a light return spring connecting said second arm to said main frame, whereby the operator can hold said hydraulic valve open as the cutter frame and pickup frame are lowered and can sense through the handle when said pickup frame reaches a predetermined position which stretches the chain and sends through said spring a force tending to push said first arm against said sensing end.

References Cited by the Examiner

UNITED STATES PATENTS

| | | | |
|---|---|---|---|
| 1,442,979 | 1/1923 | Shaw | 171—94 |
| 1,487,821 | 3/1924 | Stoltenberg | 171—94 |
| 1,873,681 | 8/1932 | Urschel | 130—30 |
| 1,928,237 | 9/1933 | Wickersham | 56—351 |
| 1,975,668 | 10/1934 | Rodin | 171—14 |
| 1,984,826 | 12/1934 | Bunker | 171—126 XR |
| 2,010,335 | 8/1935 | Stoltenberg | 171—14 |
| 2,311,169 | 2/1943 | Gordon et al. | 130—30 |
| 2,468,639 | 4/1949 | Sample | 171—127 XR |
| 2,528,341 | 10/1950 | Creely | 193—40 |
| 2,539,834 | 1/1951 | Hatton | 171—94 XR |
| 2,614,376 | 10/1952 | Madsen | 56—229 |
| 2,643,752 | 6/1953 | Smith | 193—40 |
| 2,657,798 | 11/1953 | Young | 130—30 XR |
| 2,709,326 | 5/1955 | Coombe | 56—229 |
| 2,711,103 | 6/1955 | Miner | 74—230.17 |
| 2,717,077 | 9/1955 | Leighton et al. | 130—30 XR |
| 2,754,691 | 7/1956 | May | 74—230.17 |
| 2,777,266 | 1/1957 | Middleton et al. | 171—14 |
| 2,795,100 | 6/1957 | Sund | 56—364 |
| 2,901,048 | 7/1959 | Krukowski | 171—28 |
| 3,078,926 | 2/1963 | Ries et al. | 171—14 |
| 3,203,430 | 7/1965 | Lorenzen et al. | 130—30 |

ABRAHAM G. STONE, *Primary Examiner.*

ANTONIO F. GUIDA, *Examiner.*